US010347122B2

(12) United States Patent
Takenaka et al.

(10) Patent No.: US 10,347,122 B2
(45) Date of Patent: Jul. 9, 2019

(54) ROAD CONDITION MONITORING SYSTEM

(71) Applicant: DENSO CORPORATION, Kariya, Aichi-pref. (JP)

(72) Inventors: Kazuhito Takenaka, Kariya (JP); Kenji Muto, Kariya (JP); Masumi Egawa, Kariya (JP); Seiichi Furuta, Kariya (JP)

(73) Assignee: DENSON CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/646,879

(22) Filed: Jul. 11, 2017

(65) Prior Publication Data

US 2018/0158323 A1  Jun. 7, 2018

(30) Foreign Application Priority Data

Jul. 12, 2016 (JP) ................................ 2016-137591
Jul. 12, 2016 (JP) ................................ 2016-137593

(51) Int. Cl.
*H04N 7/18* (2006.01)
*G08G 1/01* (2006.01)
(Continued)

(52) U.S. Cl.
CPC ....... *G08G 1/0112* (2013.01); *G06K 9/00744* (2013.01); *G06K 9/00771* (2013.01);
(Continued)

(58) Field of Classification Search
CPC .......... G08G 1/0141; G08G 1/096716; G08G 1/096741; G08G 1/096775; G08G 1/0112;
(Continued)

(56) References Cited

U.S. PATENT DOCUMENTS

2007/0005234 A1  1/2007  Kashiwase et al.
2008/0140303 A1  6/2008  Hiruta et al.
(Continued)

FOREIGN PATENT DOCUMENTS

JP         2972479 B2    11/1999
JP      2013-250663      12/2013
(Continued)

OTHER PUBLICATIONS

T. Taniguchi et al, "Semiotic Prediction of Driving Behavior using Unsupervised Double Articulation Analyzer," IEEE Intelligent Vehicles Symposium, 2012.
(Continued)

*Primary Examiner* — Tung T Vo
(74) *Attorney, Agent, or Firm* — Knobbe, Martens, Olson & Bear, LLP

(57) ABSTRACT

In an anomaly detection apparatus mounted in a vehicle, a model storage stores a driving model which is set corresponding to a travel location of the vehicle traveling on a roadway and represents a normal driving state as the vehicle is traveling at the travel location. A data acquirer acquires driving performance data representing the driving state of the vehicle. A degree-of-anomaly calculator calculates a degree of anomaly in the driving state based on the driving model stored in the model storage and the driving performance data acquired by the data acquirer. A vehicle-mounted transmitter, if the degree of anomaly calculated by the degree-of-anomaly calculator exceeds an anomaly determination value for determining the presence of an anomaly in the driving state, transmits at least the degree of anomaly and the travel location corresponding to the degree of anomaly to a monitoring center located external to the vehicle and detects an anomaly in the road condition based on the degree of anomaly.

22 Claims, 14 Drawing Sheets

(51) Int. Cl.
*G06K 9/00* (2006.01)
*H04N 5/77* (2006.01)
*G08G 1/0967* (2006.01)
*H04N 9/804* (2006.01)

(52) U.S. Cl.
CPC ....... *G06K 9/00805* (2013.01); *G08G 1/0129* (2013.01); *G08G 1/0141* (2013.01); *G08G 1/096716* (2013.01); *G08G 1/096741* (2013.01); *G08G 1/096775* (2013.01); *H04N 5/77* (2013.01); *H04N 7/183* (2013.01); *H04N 9/8042* (2013.01)

(58) Field of Classification Search
CPC .......... G06K 9/00744; G06K 9/00805; G06K 9/00771; H04N 5/77; H04N 9/8042; H04N 7/183
USPC ........................................................ 348/148
See application file for complete search history.

(56) References Cited

U.S. PATENT DOCUMENTS

2012/0242505 A1* 9/2012 Maeda ............. G08G 1/096783 340/905
2012/0330493 A1 12/2012 Hanatsuka et al.
2013/0033603 A1 2/2013 Suzuki et al.
2014/0028848 A1 1/2014 Takenaka et al.
2016/0311423 A1* 10/2016 Storm ................... G06Q 50/30
2017/0358154 A1* 12/2017 Ishikawa ................ G06N 5/04

FOREIGN PATENT DOCUMENTS

| JP | 2014-235605 | 12/2014 |
|---|---|---|
| JP | 2015-229433 | 12/2015 |
| JP | 2016-118906 | 6/2016 |
| JP | 2017-010206 | 1/2017 |

OTHER PUBLICATIONS

K. Takenaka et al, "Contextual Scene Segmentation of Driving Behavior based on Double Articulation Analyzer," IEEE/RSJ International Conference on Intelligent Robots and Systems, 2012.

D. Blei et al, "Latent Dirichlet Allocation," Journal of Machine Learning Research, 2003.

T. Griffiths & M. Steyvers, "Finding Scientific Topics," Proceedings of the National Academy of Sciences, 2004.

T. Nakamura, et al, "Grounding of word meanings in multimodal concepts using LDA," IEEE/RSJ International Conference on Intelligent Robots and Systems, 2009.

* cited by examiner

ROAD CONDITION MONITORING SYSTEM

CROSS-REFERENCE TO RELATED APPLICATION

This application is based on and claims the benefit of priority from earlier Japanese Patent Applications No. 2016-137593 and No. 2016-137591 both filed Jul. 12, 2016, the descriptions of which are incorporated herein by reference.

BACKGROUND

Technical Field

The present disclosure relates to techniques for detecting an anomaly in a road condition.

Related Art

A technique is known that detects an anomaly in a road condition, such as occurrence of accidents or presence of objects that have fallen onto the road, based on a driving state of a vehicle (for example, see Japanese Patent No. 2972479).

In the technique of Japanese Patent No. 2972479, image data captured by a plurality of cameras disposed along a road are image-processed by an anomaly detection apparatus disposed external to the vehicle to detect the driving state of the vehicle. The anomaly detection apparatus detects an anomaly in the road condition based on the detected driving state of the vehicle.

In the technique of Japanese Patent No. 2972479, however, the anomaly detection apparatus disposed external to the vehicle detects a driving state of the vehicle, and based on the detected driving state, detects an anomaly in the road condition. Thus, this technique suffers from the drawback that the processing load for detecting an anomaly in the road condition is concentrated in one place, i.e., the anomaly detection apparatus disposed external to the vehicle.

In addition, conventionally, a monitoring system is known that monitors a road condition using video acquired from a vehicle-mounted camera, and if an anomaly is detected, delivers anomaly information to vehicles via the monitoring apparatus of a monitoring center. For example, in a technique disclosed in Japanese Patent No. 5551236, a vehicle-mounted apparatus detects a road condition from an image captured by the vehicle-mounted camera via image recognition, compares the detection result with prepared contents of road condition database, and if a change in the road condition is detected, transmits the video to the monitoring apparatus of the monitoring center. In the monitoring center, an operator visually checks the video received from the monitoring apparatus, and then the monitoring apparatus delivers the check result to vehicles.

The disclosed apparatus of Japanese Patent No. 5551236 that detects a road condition via image recognition needs to have recognition results corresponding to all road conditions stored in the database. However, the road conditions may vary not only with occurrence of accidents or presence of objects that have fallen onto the road, but also with changes in events, such as weather, time of day, traffic, or peripheral buildings. In addition, since there are various variations in these events, the disclosed apparatus suffers from the drawback that it is impossible to accurately detect only an anomaly.

As described above, it is impossible to determine whether or not an abnormal situation is actually occurring, only via image recognition with sufficiently high accuracy. It is thus necessary to visually check the video in the monitoring center. That is, to detect occurrence of an abnormal situation without overlooking it, it is required that, even in the presence of a relatively small change in the road condition, the vehicle-mounted apparatus determine that an anomaly is occurring, and the monitoring center apparatus visually check whether or not the anomaly is actually occurring. However, such a configuration suffers from an increase in the communications traffic from the vehicle to the monitoring center apparatus and a large amount of workload for visual checks in the monitoring center apparatus.

In consideration of the foregoing, exemplary embodiments of the present invention are directed to providing techniques for distributing the processing load to detect an anomaly in a road condition.

SUMMARY

In accordance with an exemplary embodiment of the present invention, there is provided an anomaly detection apparatus incorporated in a monitoring system for monitoring a road condition based on a driving state of a vehicle. The anomaly detection apparatus includes a model storage, a data acquirer, a degree-of-anomaly calculator, and a vehicle-mounted transmitter.

The model storage is configured to store a driving model which is set corresponding to a travel location of the vehicle traveling on a roadway and represents a normal driving state as the vehicle is traveling at the travel location. The data acquirer is configured to acquire driving performance data representing the driving state of the vehicle. The degree-of-anomaly calculator is configured to calculate a degree of anomaly in the driving state based on the driving model stored in the model storage and the driving performance data acquired by the data acquirer.

The vehicle-mounted transmitter is configured to, if the degree of anomaly calculated by the degree-of-anomaly calculator exceeds an anomaly determination value for determining the presence of an anomaly in the driving state, transmit at least the degree of anomaly and the travel location corresponding to the degree of anomaly to a monitoring center located external to the vehicle. The monitoring center is configured to detect an anomaly in the road condition based on the degree of anomaly.

In this configuration, the vehicle calculates a degree of anomaly in a driving state of the vehicle, and based on the calculated degree of anomaly in the driving state of the vehicle, the monitoring center located external to the vehicle detects the presence of an anomaly in a road condition. Therefore, the burden of detecting a road condition anomaly is distributed between the vehicle and the monitoring center, which can prevent the burden from being concentrated in one place.

To detect the presence of an anomaly in a road condition, each vehicle calculates a degree of anomaly in a driving state of the vehicle, which can reduce the burden of the monitoring center as much as possible.

In accordance with another exemplary embodiment of the present invention, there is provided a monitoring system for monitoring a road condition using information acquired at a vehicle, including a vehicle-mounted apparatus mounted in the vehicle and a monitoring apparatus that communicates with the vehicle-mounted apparatus. The vehicle-mounted apparatus includes a data acquirer, a data transmitter, a video recorder, and a video provider. The data acquirer is configured to repeatedly acquire driving performance data representing at least either behaviors of an own vehicle that is the vehicle carrying the vehicle-mounted apparatus or driving manipulations on the own vehicle. The data transmitter is configured to transmit correspondence information to the monitoring apparatus. The correspondence information associates the driving performance data acquired by the data acquirer and index information including at least a location where the driving performance data was acquired. The video recorder is configured to store video acquired from a vehicle-mounted camera for capturing images of surroundings around the own vehicle in association with the index information. The video provider is configured to, in response to a request from the monitoring apparatus, provide the video having the index information that meets an acquisition condition indicated by the request to the monitoring apparatus.

The monitoring apparatus includes a model storage, a data receiver, an anomaly detector, and a video acquirer. The model storage is configured to store driving models, where each driving model represents typical features of the driving performance data of a vehicle traveling on a roadway. The data receiver is configured to acquire the correspondence information from the vehicle-mounted apparatus. The anomaly detector is configured to compare driving information with a subject driving model and thereby detect an abnormal section of the roadway determined to have an anomaly in the driving information, where the driving information is the driving performance data included in acquired information that is the corresponding information acquired by the data receiver, and the subject driving model is a driving model stored in the model storage corresponding to a subject location that is a location indicated by the index information included in the acquired information. The video acquirer is configured to set the acquisition condition such that the acquisition condition includes at least a location of the abnormal section detected by the anomaly detector and acquire the video that meets the acquisition condition from the vehicle-mounted apparatus.

In this configuration, comparing the driving performance data of the vehicle with the driving model, it is possible to properly detect an abnormal section without using images.

The monitoring apparatus acquires only the video about the abnormal section from the vehicle, which can reduce the communications traffic and the monitoring apparatus and workload of visual confirmation or the like at the monitoring apparatus.

DESCRIPTION OF SPECIFIC EMBODIMENTS

Embodiments of the present invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

1. First Embodiment 1-1. System Configuration

Figure 1:
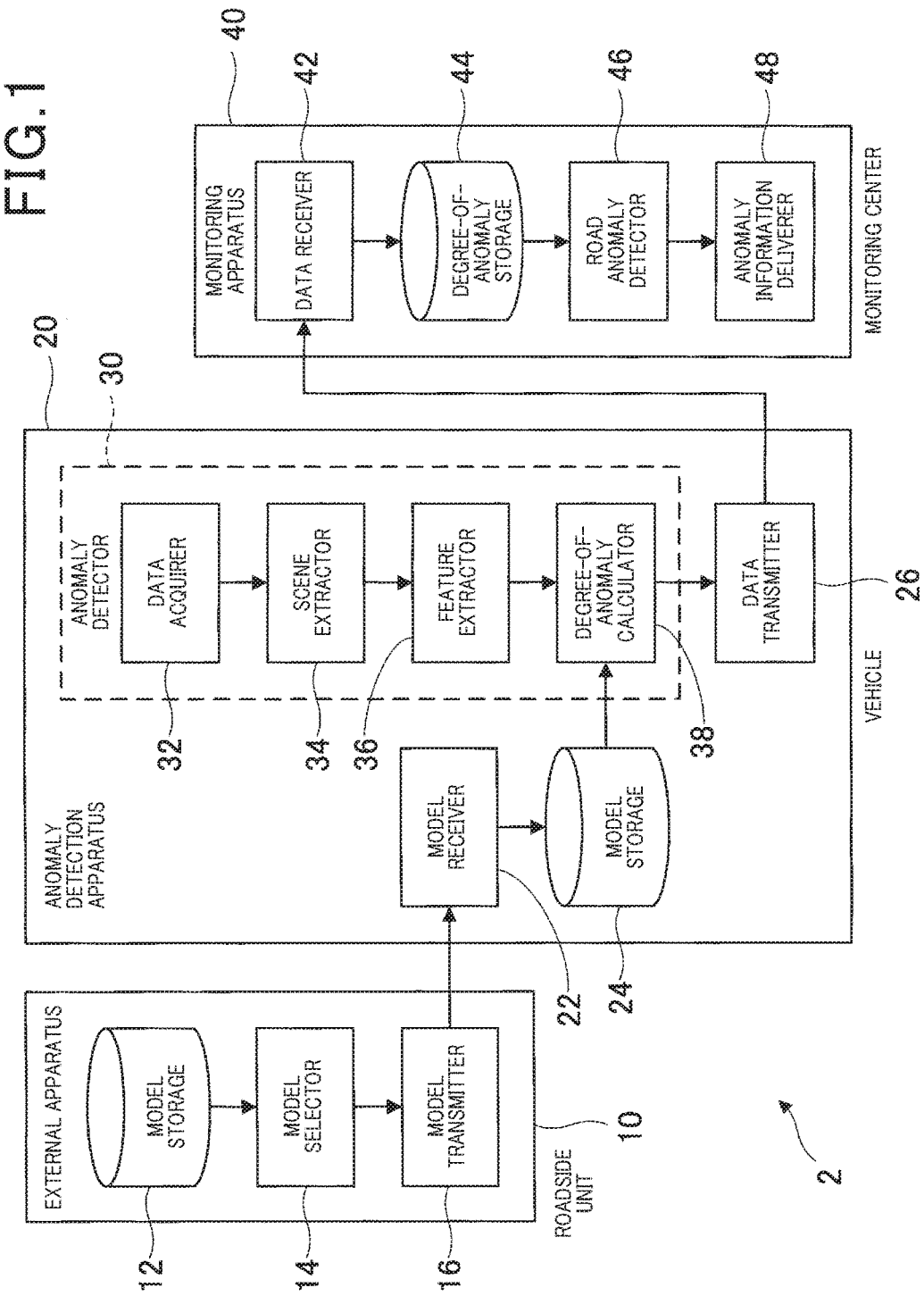
FIG. 1 is a block diagram of a monitoring system in accordance with a first embodiment.

As shown in FIG. 1, a monitoring system 2 in accordance with a first embodiment of the present invention includes an external apparatus 10, an anomaly detection apparatus 20, and a monitoring apparatus 40. The external apparatus 10 may be installed in a roadside unit of an expressway tollgate. The anomaly detection apparatus 20 may be mounted in a vehicle, such as a passenger car. The monitoring apparatus 40 may be installed in a monitoring center that manages information about conditions of a road on which the vehicle is traveling.

The external apparatus 10, the anomaly detection apparatus 20, and the monitoring apparatus 40 are data communicable with each other. The external apparatus 10 and the anomaly detection apparatus 20 data communicate with each other via dedicated short range communication. The anomaly detection apparatus 20 and the monitoring apparatus 40 data communicate with each other via a wireless network of a cellular carrier or the internet network or the like (not shown).

Each of the external apparatus 10, the anomaly detection apparatus 20, and the monitoring apparatus 40 includes at least one microcomputer formed of a central processing unit (CPU), a read-only memory (ROM), a random access memory (RAM), and a semiconductor memory, such as a flash memory (these elements being not shown). The number of microcomputers included in each of the external apparatus 10, the anomaly detection apparatus 20 and the monitoring apparatus 40 may be equal to or greater than one.

Functions (described later) of each of the external apparatus 10, the anomaly detection apparatus 20, and the monitoring apparatus 40 may be implemented by the CPU executing computer programs stored in the ROM, the flash memory, or a non-transitory computer readable storage medium, such as a hard disk.

The functions of the external apparatus 10, the anomaly detection apparatus 20, and the monitoring apparatus 40 may be realized not only in software, but also in hardware, for example, in logic circuitry, analog circuitry, or combinations thereof.

The monitoring apparatus 40 processes a large amount of data. Therefore, the monitoring apparatus 40 may be implemented by a large-scale computer instead of the microcomputer.

Configurations of the external apparatus 10 and the anomaly detection apparatus 20, and the monitoring apparatus 40 will now be described in the following.

External Apparatus

The external apparatus 10 includes a model storage 12, a model selector 14, and a model transmitter 16. The external apparatus 10 may be installed in each of roadside units deployed, for example, at entry and/or exit of an expressway, in main line tollgates along an expressway, or on an expressway. Such locations where the roadside units are deployed are hereinafter referred to as roadside unit locations.

The model storage 12 stores driving models each representing a normal driving state of the vehicle when the vehicle travels in a route section from the current roadside unit location to an adjacent roadside unit location in a travel direction that the vehicle is likely to travel or in a route section from the current roadside unit location to the end point of the expressway.

A driving model is set for each unit road section of the route section such that the normal driving state exhibits a specific pattern in the unit road section. That is, a driving model is set associated with each unit road section of the route section. For example, for an expressway, a driving model is set associated with each unit road section of the route section, such as a straight section, a curve, an upward slope, a downward slope, a merging, a branch, or a tollgate.

A driving model may be set for each unit road section having a length long enough to exhibit a specific pattern of the driving state, where each unit road section may have a variable length depending on a road structure or may have a fixed length.

In addition, the driving model may be different depending on a time period of the day, where a different driving model may be set according to a time period of the day. In the model storage 12, each driving model may be updated every predetermined time interval or each time a new driving model is provided for replacement.

Figure 2:
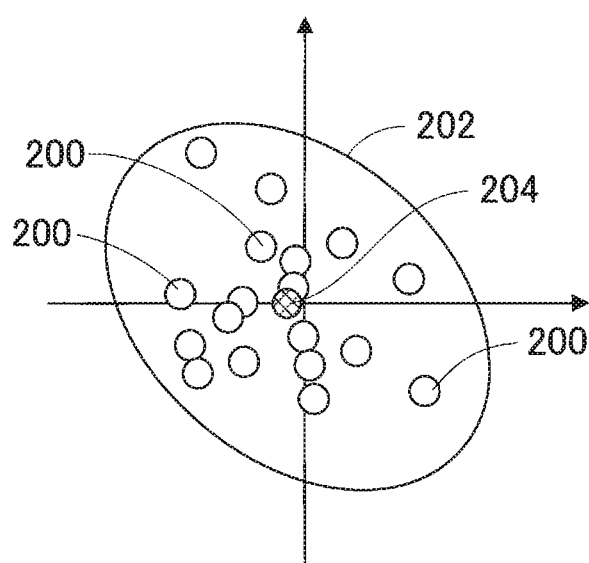
FIG. 2 is an illustration of modeling based on topic proportions.

As shown in FIG. 2, the model storage 12 stores a variance 202 and a mean vector 204 calculated for each set of driving features 200 calculated based on vehicle driving performance data to represent features of the driving states, as a driving model.

The variance 202 is expressed by a variance-covariance matrix for a set of driving features 200. Each driving model is a probabilistic model for driving features, which represents features of the driving state indicated by the variance 202 and the mean vector 204. In the present embodiment, a topic proportion is used as the driving behavior features. The topic proportion will be described later in detail.

The model selector 14 selects one of the driving models to be transmitted by the model transmitter 16 to the vehicle using one of the following three methods (1)-(3) as the vehicle approaches the roadside unit at the roadside unit location.

(1) In cases where, when passing through a roadside unit location (herein referred to as a current roadside unit location), the travel direction is determined by a structure of the road and there is another roadside unit location in the travel direction where another external apparatus 10 is installed, the model selector 14 selects the driving model for a route section from the current roadside unit location to the other roadside unit location. In cases where there is no other roadside unit location from the current roadside unit location to the end point of the expressway, the model selector 14 selects the driving model for the route section from the current roadside unit location to the end point of the expressway.

(2) In cases where, when passing through a roadside unit location (herein referred to as a current roadside unit location), there are a plurality of directions in which the vehicle is allowed to travel, so that it is impossible to determine in which direction the vehicle will travel, the model selector 14 selects, in each one of directions, among the plurality of directions, in which there is another roadside unit location where another external apparatus 10 is installed, the driving model for a route section from the current roadside unit location to the other roadside unit location. In each one of directions, among the plurality of directions, in which there is no roadside unit location, the model selector 14 selects a driving model for the route section from the current roadside unit location to the end point of the expressway.

(3) In cases where, when passing through a roadside unit location (herein referred to as a current roadside unit location), a destination is known in conjunction with a vehicle-mounted navigation unit, the model selector 14 selects the driving model for a route section from the current roadside unit location to the destination or the driving model for a route section from the current roadside unit location to an adjacent roadside unit location within the route section from the current roadside unit location to the destination.

When the vehicle approaches the external apparatus 10, the model transmitter 16 transmits to the vehicle the driving model selected by the model selector 14 in response to a request from the vehicle.

Anomaly Detection Apparatus

As shown in FIG. 1, the vehicle-mounted anomaly detection apparatus 20 includes a model receiver 22, a model storage 24, a data transmitter 26, and an anomaly detector 30.

The model receiver 22 receives the driving models transmitted from the external apparatus 10. The model storage 24 stores the driving models received by the model receiver 22 from the external apparatus 10.

The data transmitter 26 is configured to, if a degree of anomaly calculated by the anomaly detector 30 exceeds an anomaly determination value for determining whether or not the driving state of the vehicle is abnormal, then transmit at least the degree of anomaly, a current location of the vehicle, and a date and time, to the monitoring center. The data transmitter 26 may further transmit the type of vehicle, driving performance data, driver information including his or her sex, age, and driving operational habit of the driver, to the monitoring center.

The anomaly detector 30 compares driving features calculated based on the vehicle driving performance data with the driving model stored in the model storage 24 and calculates a degree of anomaly that represents to what extent the driving features calculated based on the driving performance data deviate from the driving model, that is, how low the occurrence probability of the driving features to be detected is. The degree of anomaly increases with increasing degree of deviation of the driving features from the driving model or with decreasing occurrence probability of the driving features.

The anomaly detector 30 includes a data acquirer 32, a scene extractor 34, a feature extractor 36, and a degree-of-anomaly calculator 38.

The data acquirer 32 repeatedly acquires driving operation data about driving by the driver of the vehicle and vehicle behavior data about vehicle behaviors that result from the driving by the driver from various vehicle-mounted sensors. The data acquirer 32 generates differential data representing derivatives of the driving operation data and the vehicle behavior data, and outputs driving performance data that is multidimensional data including the driving operation data, the vehicle behavior data, and the differential data.

Preferably, the data acquirer 32 may normalize the driving performance data by a normalization parameter prepared for each of types of vehicles to output the normalized driving performance data, which may allow differences in types of vehicles to be accommodated.

The driving operation data includes an accelerator pedal position corresponding to a depression amount of an accelerator pedal, a brake pressure corresponding to a depression amount of a brake pedal, and a steering angle of a steering wheel. The vehicle behavior data includes a vehicle speed, a yaw rate, and accelerations.

The data acquirer 32 acquires a location of the vehicle from a global positioning system (GPS) device. The data acquirer 32 may further acquire a travel path to the destination from the GPS device and the navigation unit, and image data about surroundings of the vehicle from the vehicle-mounted camera, as the driving performance data.

Figure 3:
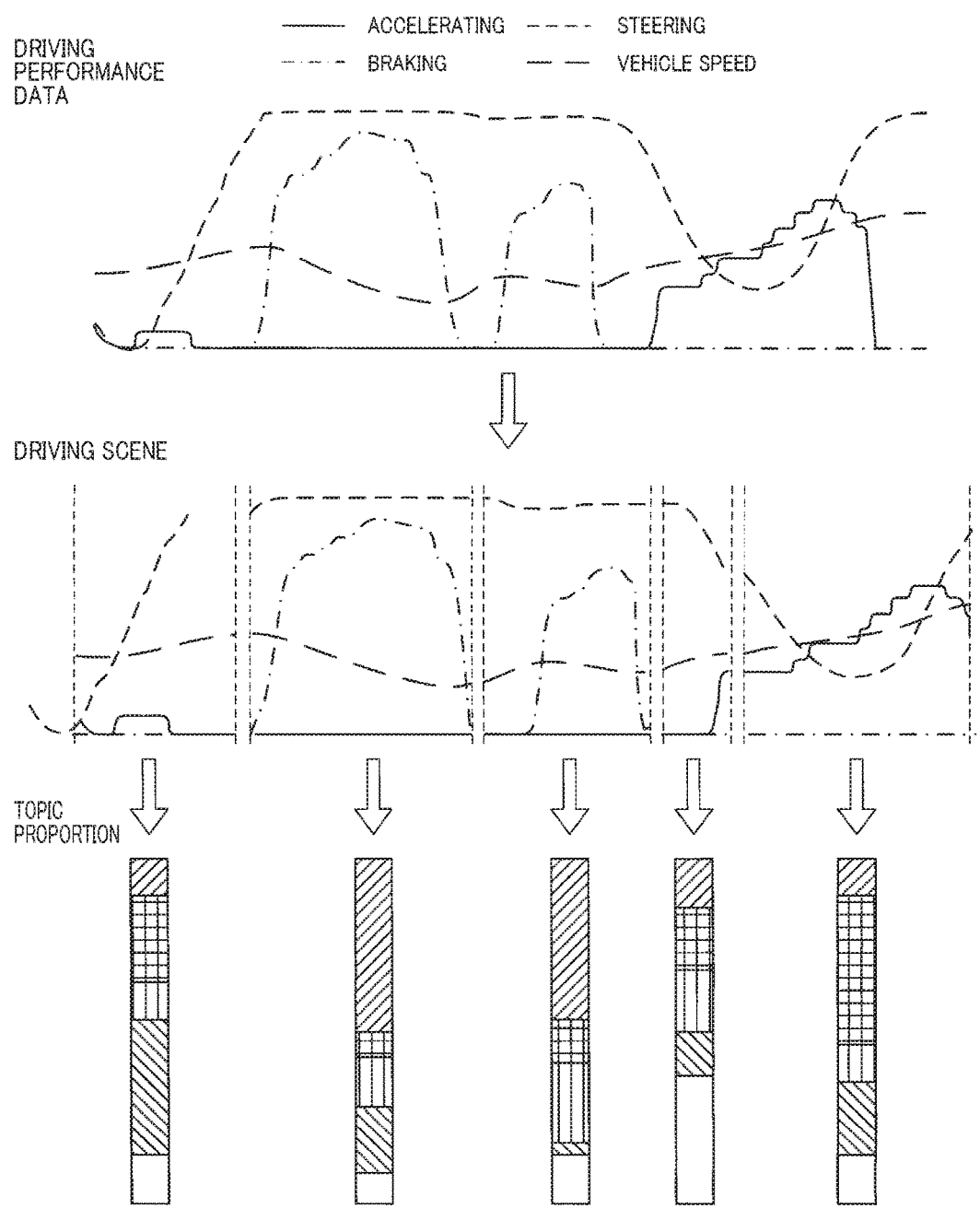
FIG. 3 is an illustration of correspondence between driving performance data and driving scenes.

As shown in FIG. 3, the scene extractor 34 finds recurring time-sequence patterns from driving performance data received from the data acquirer 32 to extract a sequence of vehicle states as a driving scene. FIG. 3 illustrates, as an example, five driving scenes extracted from the driving performance data.

A technique disclosed in Patent Application Laid-Open Publication No. 2013-250663 may be used as a method for extracting the driving scenes. Another method for extracting the driving scenes may include extracting driving scenes corresponding to a predetermined rule, such as a driving scene where the vehicle is stationary, a driving scene where the vehicle is traveling straight, and a driving scene where the vehicle is making a lane change.

The feature extractor 36 extracts driving features for each segmented driving scene received from the scene extractor 34 extracted from the time-sequence driving performance data outputted by the data acquirer 32.

In the present embodiment, one or more items of data, such as an accelerator pedal position, a brake pressure, a steering angle, a vehicle speed, a yaw rate, and their differential data, are used as the driving performance data. As shown in FIG. 3, the topic proportion is used as driving features for each segmented driving scene.

When the topic proportion is used as driving features, a histogram may be used to represent a feature distribution of the driving performance data for each segmented driving scene. A range of value of the driving performance data is divided into bins. The histogram represents an appearance frequency of the driving performance data in each bin.

In the feature extractor 36, a plurality of basis feature distributions representative of characteristic patterns of the driving performance data are prepared in advance as driving topics, which are used to represent one or more types of feature distributions of one or more items of the driving performance data. The feature extractor 36 uses the plurality of basis feature distributions to represent one or more types of feature distributions using the driving topics, and calculates the topic proportion as a low dimensional vector expressed by mixing ratios of the basis feature distributions.

The topic proportion is a known technique disclosed in, for example, Japanese Patent Application Laid-Open Publication No. 2014-235605 and will therefore not be described in detail.

There are other methods for representing driving features. For example, the histogram set forth above that represents appearance frequencies for each item of driving performance data may be used as a feature distribution. Such feature distributions for one or more items of driving performance data may be adjoined side by side to provide the driving features.

The degree-of-anomaly calculator 38 compares the driving model stored in the model storage 24 corresponding to a current driving scene with the topic proportion calculated by the feature extractor 36. The driving model stored in the model storage 24 includes a variance and a mean vector as a probabilistic model for the topic proportion.

Based on a comparison result between the driving model and the current topic proportion, the degree-of-anomaly calculator 38 calculates a degree of deviation indicative of to what extent the topic proportion representing the current driving state is deviating from the driving model, as a degree of anomaly in the vehicle driving state.

Figure 4:
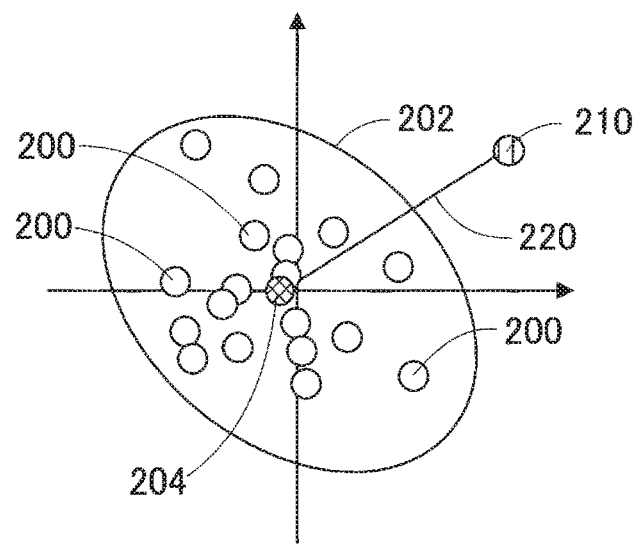
FIG. 4 is an illustration of calculation of a degree of anomaly.

For example, as shown in FIG. 4, the degree of anomaly calculated by the degree-of-anomaly calculator 38 is a distance 220 between the topic proportion 210 calculated from the current driving state and the mean vector 204 calculated from the topic proportions 200, normalized by the variance-covariance matrix.

Figure 5:
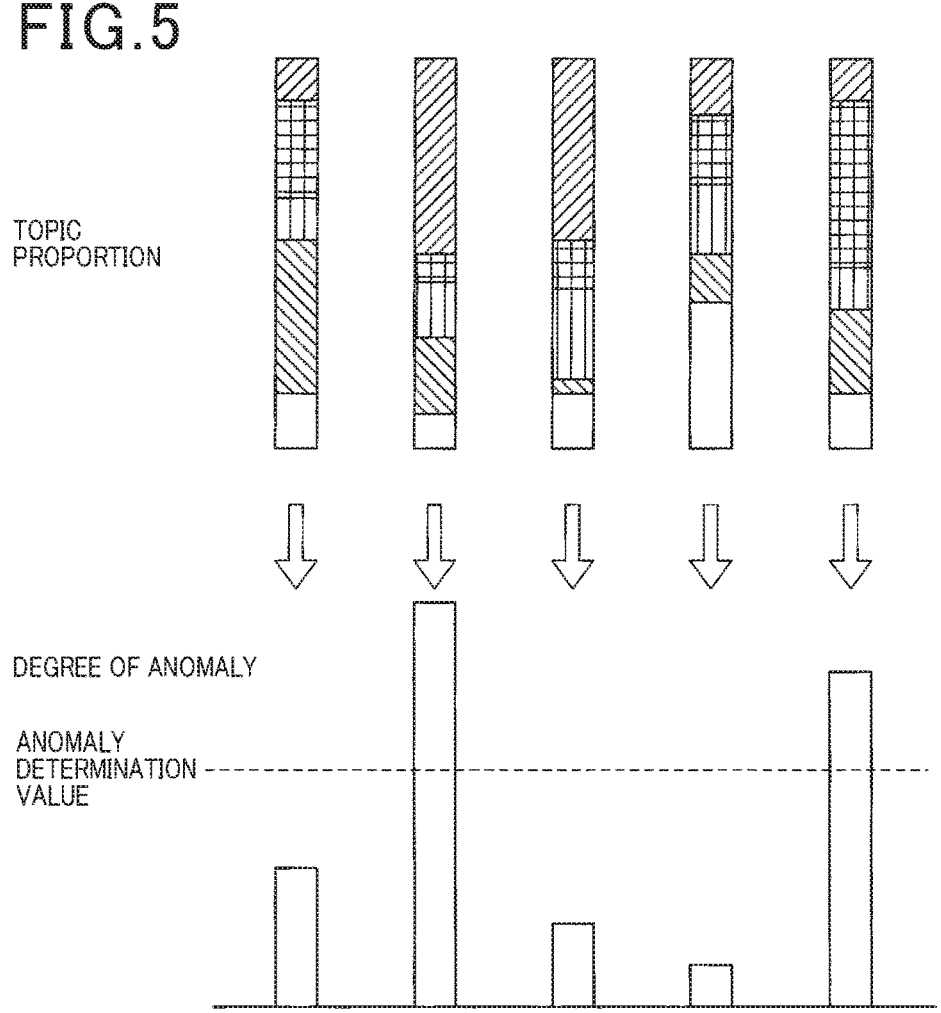
FIG. 5 is illustration of correspondence between a topic proportion and a degree of anomaly.

As described above, as shown in FIG. 5, if the degree of anomaly calculated for the topic proportion exceeds an anomaly determination value for determining that the current driving state is abnormal, the data transmitter 26 transmits the degree of anomaly, the location of the vehicle, and the date and time, to the monitoring center.

Monitoring Apparatus 40

The monitoring apparatus 40 is installed in a monitoring center located external to the vehicle. The monitoring apparatus 40 includes a data receiver 42, a degree-of-anomaly storage 44, a road anomaly detector 46, and an anomaly information deliverer 48.

The data receiver 42 receives, from each vehicle, a degree of anomaly exceeding the anomaly determination value, a location of the vehicle, and the date and time.

The degree-of-anomaly storage 44 accumulates and stores the degree of anomaly in the topic proportion exceeding the anomaly determination value, received from each vehicle via the data receiver 42. More specifically, a roadway may be subdivided into subsections of the same length or variable length depending on road structure. Each subsection will hereinafter be referred to as a node. The degree-of-anomaly storage 44 accumulates and stores a degree of anomaly exceeding the anomaly determination value associated with a subsection closest to a location of the vehicle transmitted together with the degree of anomaly, but deletes the degree of anomaly upon passing of a predetermined amount of time after being stored.

Alternatively, the degree-of-anomaly storage 44 may accumulate and store a degree of anomaly exceeding the anomaly determination value associated not only with the closest subsection, but also with the second closest subsection or with the second and third closest subsections. Even if there is an anomaly in the driving state of each vehicle due to the same cause, this configuration may alleviate issues such that a location where the driving state anomaly is occurring may vary with the vehicle, which can also accommodate a positional tolerance of a GPS device. As another alternative, the degree-of-anomaly storage 44 may accumulate and store a degree of anomaly exceeding the anomaly determination value associated not only with the closest subsection, but also with nodes located within a predetermined distance from the vehicle that has transmitted the degree of anomaly.

Figure 6:
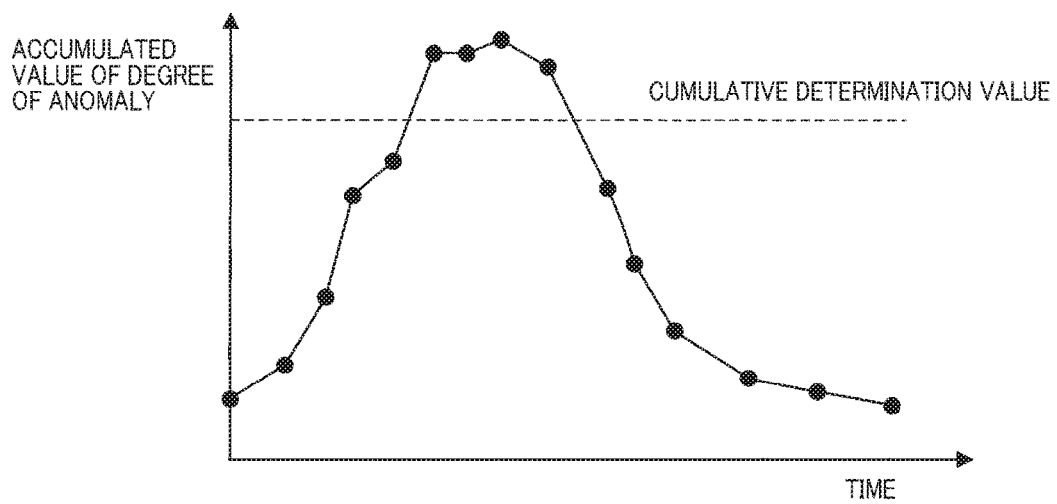
FIG. 6 is an example of temporal progression of an accumulated value of degree of anomaly.

The degree of anomaly stored associated with each node will be deleted upon passing of a predetermined amount of time after being stored. FIG. 6 illustrates an exemplary graph of accumulated value of degree of anomaly versus time. In this example, the accumulated value of degree of anomaly exceeds an anomaly determination value for a certain amount of time.

As shown in FIG. 6, the degree of anomaly is not only accumulated and stored, but also deleted upon passing of a predetermined amount of time after being stored. Therefore, the accumulated value of degrees of anomaly may decrease. If the accumulated value of degree of anomaly exceeds a cumulative determination value, the road anomaly detector 46 determines that a road condition at a location of the node corresponding to the accumulated value of degree of anomaly is abnormal.

Upon detecting an abnormal road condition, the road anomaly detector 46 may require each vehicle that has transmitted the degree of anomaly to send image data acquired upon occurrence of the anomaly to the monitoring center. Analyzing the image data, the road anomaly detector 46 can detect in detail a location where the abnormal road condition is occurring and its abnormal cause.

The anomaly information deliverer 48 delivers, to each vehicle approaching the location where the abnormal road condition is occurring detected by the road anomaly detector 46, information that the abnormal road condition is occurring, and further notifies a road administrator of the location where the abnormal road condition is occurring.

1-2. Processing

Processing Performed in the External Apparatus 10

Figure 7:
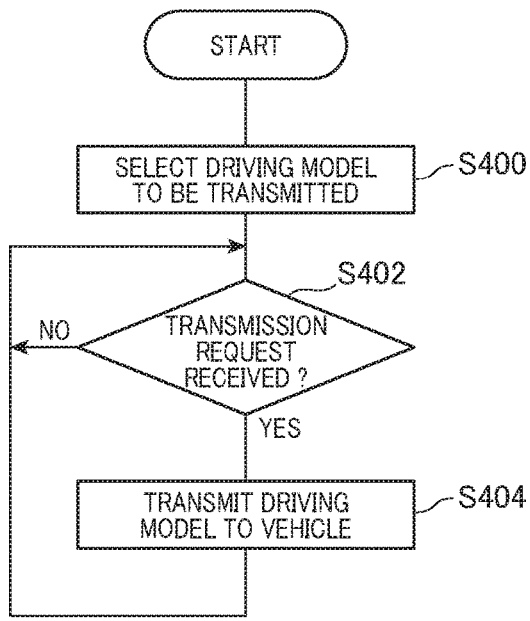
FIG. 7 is a flowchart of driving model transmission processing performed by an external apparatus.

The driving model transmission processing shown in FIG. 7 is initiated when the external apparatus 10 is powered on.

At step S400, the external apparatus 10 selects at least one driving model to be transmitted to a vehicle according to a location of the external apparatus 10. As described above, the at least one driving model to be transmitted to a vehicle may include a driving model for a route section to the next roadside unit location.

If the answer is "Yes" at step S402, that is, if a vehicle approaching the roadside unit having the external apparatus 10 installed requests transmission of a driving model, then at step S404 the external apparatus 10 transmits the at least one driving model selected at step S400 to the vehicle requesting the transmission. Thereafter, the process flow proceeds to step S402.

In cases where driving models different depending on a time period of the day are stored in the external apparatus 10, at step S400, the external apparatus 10 selects at least one driving model according to the installation location and the time period of the day.

In cases where a destination of the vehicle is known in conjunction with the vehicle-mounted navigation unit, the external apparatus 10 further selects, from the selected at least one driving model, a driving model for a route section to the destination or a driving model for a route section to the roadside unit location on the way to the destination.

Processing Performed in the Anomaly Detection Apparatus 20

Figure 8:
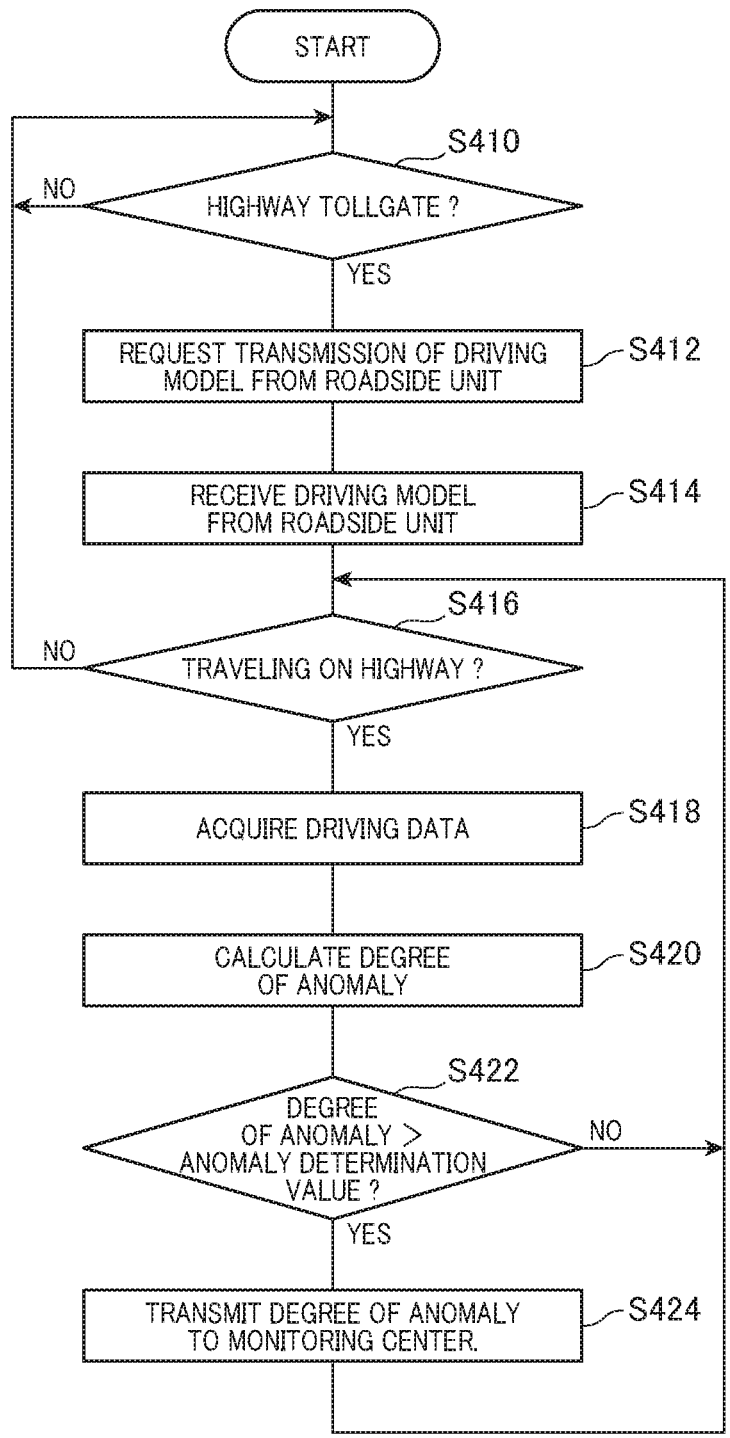
FIG. 8 is a flowchart of anomaly detection processing performed by an anomaly detection apparatus.

The anomaly detection processing shown in FIG. 8 is initiated when a vehicle start switch is turned on and the anomaly detection apparatus 20 is thereby activated.

If the answer is "Yes" at step S410, that is, if a vehicle is approaching the roadside unit location, then at step S412, the anomaly detection apparatus 20 requests transmission of a driving model from the roadside unit. Upon receipt of at least one driving model from the roadside unit at step S414, at step S416, the anomaly detection apparatus 20 determines whether or not the vehicle is traveling on an expressway. If the answer is "No" at step S416, that is, if the vehicle has exited an expressway, the process flow proceeds to step S410.

If the answer is "Yes" at step S416, that is, if the vehicle is traveling on an expressway, then at step S418 the anomaly detection apparatus 20 acquires an accelerator pedal position, a brake pressure, a steering angle, a vehicle speed, a yaw rate, and their differential data, as driving performance data.

At step S420, the anomaly detection apparatus 20 selects, from the at least one driving model received at step S414, a driving model corresponding to the current location where the vehicle is traveling, and as described above, calculates a topic proportion from the driving performance data acquired at step S418. The anomaly detection apparatus 20 compares the selected driving model with the calculated topic proportion to calculate a degree of anomaly in the topic proportion.

At step S422, the anomaly detection apparatus 20 determines whether or not the degree of anomaly calculated at step S420 is above the anomaly determination value for determining that the current driving state is abnormal.

If the answer is "No" at step S422, that is, if the degree of anomaly calculated at step S420 is at or below the anomaly determination value, then the process flow proceeds to step S416.

If the answer is "Yes" at step S422, that is, if the degree of anomaly calculated at step S420 is above the anomaly determination value, then at step S424 the anomaly detection apparatus 20 transmits the degree of anomaly, the location of the vehicle, the date and time, to the monitoring center. Thereafter, the process flow proceeds to step S416.

1-3. Advantages

The present embodiment can provide the following advantages.

(1a) The anomaly detection apparatus 20 mounted in a vehicle calculates a degree of anomaly in a driving state of the vehicle, and based on the calculated degree of anomaly in the driving state of the vehicle, the monitoring apparatus 40 of the monitoring center located external to the vehicle detects the presence of an anomaly in a road condition. This can distribute the burden of detecting a road condition anomaly between the vehicle and the monitoring center, which prevent the burden from being concentrated in one place.

(1b) To detect the presence of an anomaly in a road condition, the anomaly detection apparatus 20 of each vehicle calculates a degree of anomaly in a driving state of the vehicle, which can reduce the burden of the monitoring apparatus 40 of the monitoring center as much as possible.

(1c) The driving model is set depending on a travel location of the vehicle, which makes it possible to calculate a more accurate degree of anomaly in a driving state based on the driving model set properly depending on the travel location of the vehicle.

(1d) The driving model is transmitted from the external apparatus 10 to the anomaly detection apparatus 20 of the vehicle. Therefore, in cases where a normal driving state during travel along a route section changes in pattern due to changes in the environment or building the roadway, the driving model corresponding to the route section can be updated.

(1e) When a vehicle is approaching the external apparatus 10, the external apparatus 10 transmits to the anomaly detection apparatus 20 mounted in the vehicle a driving model for a limited route section, such as a route section from the external apparatus 10 to a tollgate provided with the next external apparatus 10, according to a location of the external apparatus 10 that the vehicle is approaching.

With this configuration, the anomaly detection apparatus 20 mounted in the vehicle does not have to receive, from the external apparatus 10, all the driving models for route sections that the vehicle can travel, which can reduce communications traffic between the external apparatus 10 and the anomaly detection apparatus 20.

(1f) Use of dedicated short-range communications between the external apparatus 10 installed in the roadside unit and the vehicle-mounted anomaly detection apparatus 20 can hasten transmission of the driving model from the external apparatus 10 to the anomaly detection apparatus 20.

(1g) A low-dimensional vector expressed by mixing ratios of a plurality of predefined basis feature distributions is used as a topic proportion. Such a topic proportion represents driving features of a driving state. This configuration can reduce the calculation burden, the complexity, and a data amount, as compared with direct use of the driving performance data as driving features.

(1h) Each driving scene is a sub-sequence of driving performance data divided as a recurring time-sequence pattern of driving performance data. A topic proportion is calculated for each driving scene as driving features of a driving state. That is, one topic proportion is calculated for each sub-sequence of driving performance data as driving features of a driving state, which can reduce a data amount as compared with calculating the topic proportion every predetermined time interval.

This configuration can reduce the burden of calculating a degree of anomaly in a driving state using the topic proportion as driving features and the burden of detecting an anomaly in a road condition based on the degree of anomaly in the driving state.

(1i) The external apparatus 10 does not store a historical set of topic proportions as a driving model, but stores a variance and mean vector for a set of topic proportions as a driving model, to transmit the driving model to the anomaly detection apparatus 20, which can reduce a data amount of the driving model. Therefore, the communications traffic between the external apparatus 10 and the anomaly detection apparatus 20 can be reduced.

(1j) Only if the degree of anomaly exceeds the anomaly determination value, the vehicle-mounted anomaly detection apparatus 20 transmits anomaly data including the degree of anomaly, the location of the vehicle, and the date and time, to the monitoring apparatus 40 of the monitoring center, which can reduce the communications traffic between the vehicle and the monitoring center.

In the first embodiment, the monitoring system 2 corresponds to the monitoring system, the external apparatus 10 to the external apparatus, the anomaly detection apparatus 20 to the anomaly detection apparatus, and the monitoring apparatus 40 to the monitoring apparatus.

The model transmitter 16 corresponds to the model transmitter, the model receiver 22 to the vehicle receiver, the model storage 24 to the model storage, the data transmitter 26 to the vehicle-mounted transmitter, the data acquirer 32 to the data acquirer, the scene extractor 34 to the scene extractor, the feature extractor 36 to the feature calculator, the degree-of-anomaly calculator 38 to the degree-of-anomaly calculator, the data receiver 42 to the data receiver, the degree of anomaly storage 44 to the degree of anomaly storage, and the road anomaly detector 46 to the road anomaly detector.

Step S414 corresponds to the operation of the model storage 24 as the model storage, step S418 to the operation of the data acquirer 32 as the data acquirer, step S420 to the operations of the scene extractor 34 as the scene extractor, the feature extractor 36 as the feature calculator, and the degree-of-anomaly calculator 38 as the degree-of-anomaly calculator, step S424 to the operation of the data transmitter 26 as the vehicle-mounted transmitter.

2. Modifications 2-1. Differences from First Embodiment

Figure 9:
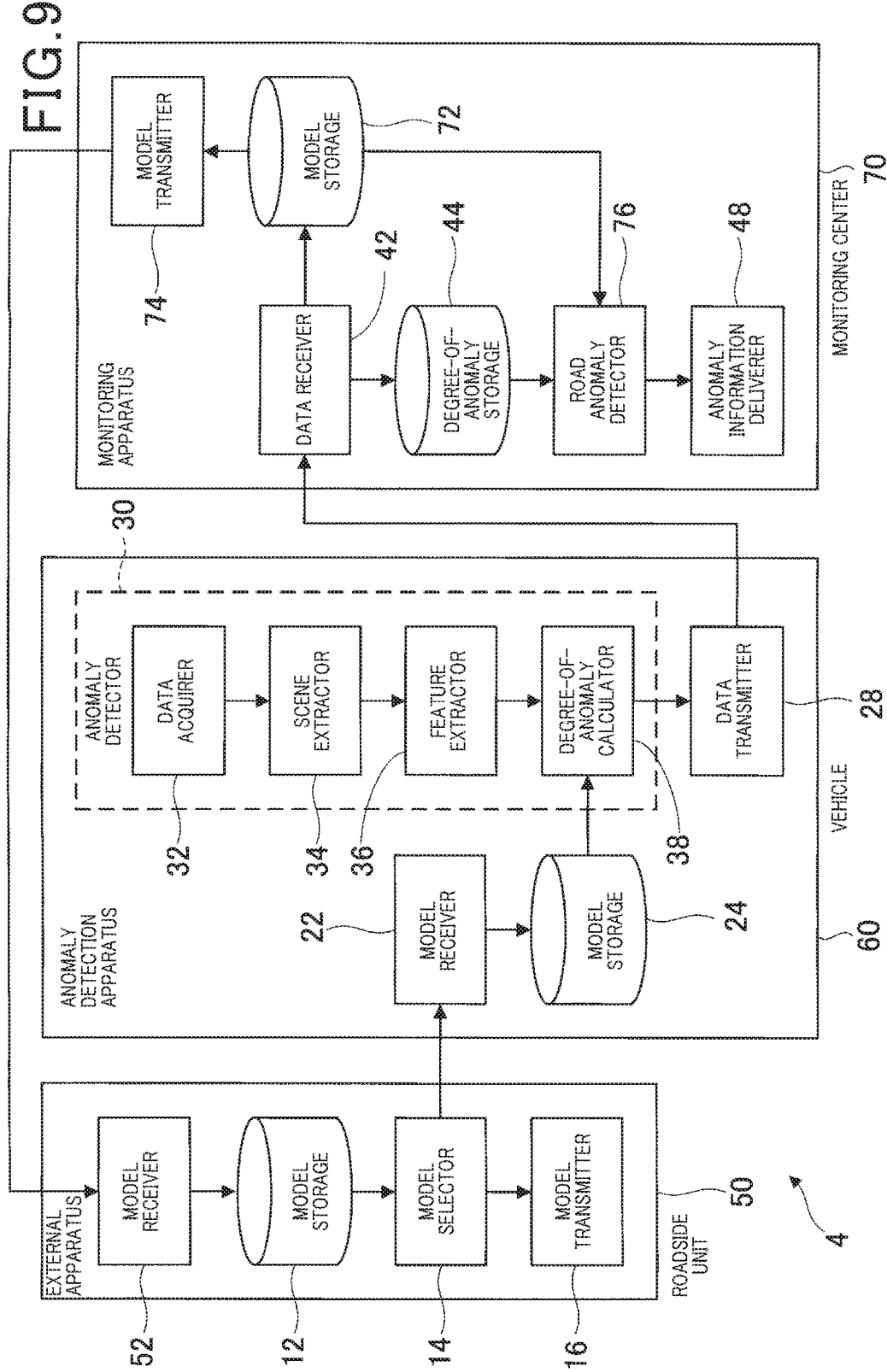
FIG. 9 is a block diagram of a monitoring system in accordance with one modification to the first embodiment.

A monitoring system 4 according to one modification to the first embodiment will now be described with reference to FIG. 9. The monitoring system 4 is similar in configuration to the first embodiment. Therefore, only differences of this modification from the first embodiment will be described. Elements having the same functions as those in the first embodiment are assigned the same reference numerals.

In the present modification, the data transmitter 28 of the vehicle-mounted anomaly detection apparatus 60 transmits the degree of anomaly, the topic proportion, the location of the vehicle, and the date and time, to the monitoring center, not only in cases where the degree of anomaly exceeds the anomaly determination value, but also in cases where the degree of anomaly is at or below the anomaly determination value. Preferably, the transmission frequency in cases where the degree of anomaly is at or below the anomaly determination value may be set lower than the transmission frequency in cases where the degree of anomaly is above the anomaly determination value.

The model storage 72 accumulates the topic proportion for each travel location of the vehicle. If the degree of anomaly received by the data receiver 42 of the monitoring apparatus 70 from the vehicle is at or below the anomaly determination value, then the model storage 72 adds the topic proportion received together with the degree of anomaly to a set of topic proportions accumulated for the travel location of the vehicle.

If the number of topic proportions added to the set of topic proportions exceeds a predetermined number, then the model storage 72 calculates a variance-covariance matrix and a mean vector from the set of accumulated topic proportions to derive a new driving model, and replaces the existing driving model with the new driving model.

When the driving model is updated in the model storage 72, the model transmitter 74 transmits the variance-covariance matrix and the mean vector for the topic proportions representing the updated driving model to the external apparatus 50 of the roadside unit located at a location corresponding to the updated driving model.

If the degree of anomaly received from the vehicle by the data receiver 42 of the monitoring apparatus 70 exceeds the anomaly determination value, then the degree-of-anomaly storage 44 accumulates and stores the degree of anomaly in the topic proportion, as in the first embodiment.

Separately from the vehicle-mounted anomaly detection apparatus 60, the road anomaly detector 76 of the monitoring apparatus 70 may compare the topic proportion received from the vehicle with its corresponding set of topic proportions stored in the model storage 72 to detect an anomaly in the road condition.

For example, instead of the degree of anomaly calculated by the vehicle-mounted anomaly detector 30, the road anomaly detector 76 may calculate a degree of anomaly from the set of topic proportions stored in the model storage 72 and the topic proportion received from the vehicle.

A method for calculating a degree of anomaly from a set of accumulated topic proportions and the topic proportion in which a degree of anomaly is to be calculated may include extracting topic proportions from the set of accumulated topic proportions close to the topic proportion in which a degree of anomaly is to be calculated and calculate a degree of anomaly based on an average of distances from the topic proportion in which a degree of anomaly is to be calculated to the extracted topic proportions. Processing after calculating the degree of anomaly may be similar to that of the first embodiment.

With this configuration, an anomaly in the road condition can be more accurately calculated than an anomaly in the road condition calculated based on the distance from the topic proportion received from the vehicle to the mean vector for the topic proportions stored as a driving model.

Upon the model receiver 52 of the external apparatus 50 receiving the driving model from the monitoring center, the model storage 12 of the external apparatus 50 updates the stored driving model with the received driving model.

2-2. Advantages

The present modification can provide the following advantages in addition to the advantages (1a)-(1h) of the embodiment set forth above.

(2a) The driving model stored in the external apparatus 50 is updated to the last one. Therefore, the anomaly detection apparatus 60 can calculate a degree of anomaly in the vehicle driving state based on the last driving model received from the roadside unit. This allows the monitoring apparatus 70 of the monitoring center to detect an anomaly in the last road condition based on the degree of anomaly received from the vehicle.

(2b) A result of detection of an anomaly by the vehicle-mounted anomaly detector 30 is transmitted to the monitoring center. Upon receipt of the result, the road anomaly detector 76 of the monitoring apparatus 70 more accurately recalculates a degree of anomaly, thereby more accurately detecting an anomaly while reducing an amount of data to be communicated from the vehicle to the monitoring center.

(2c) The vehicle-mounted anomaly detection apparatus 60 transmits data whenever the degree of anomaly exceeds the anomaly determination value, and unless the degree of anomaly exceeds the anomaly determination value, the vehicle-mounted anomaly detection apparatus 60 transmits data at a lower communication frequency. This allows the driving model to be updated using less communication data without reducing the anomaly detection accuracy.

In this modification, the monitoring system 4 corresponds to the monitoring system, the external apparatus 50 to the external apparatus, the anomaly detection apparatus 60 to the anomaly detection apparatus, and the monitoring apparatus 70 to the monitoring apparatus.

The data transmitter 28 corresponds to the vehicle-mounted transmitter, and the road anomaly detector 76 to the anomaly detector.

3. Second Embodiment

A second embodiment of this disclosure will now be described.

3-1. Overall Configuration

Figure 11:
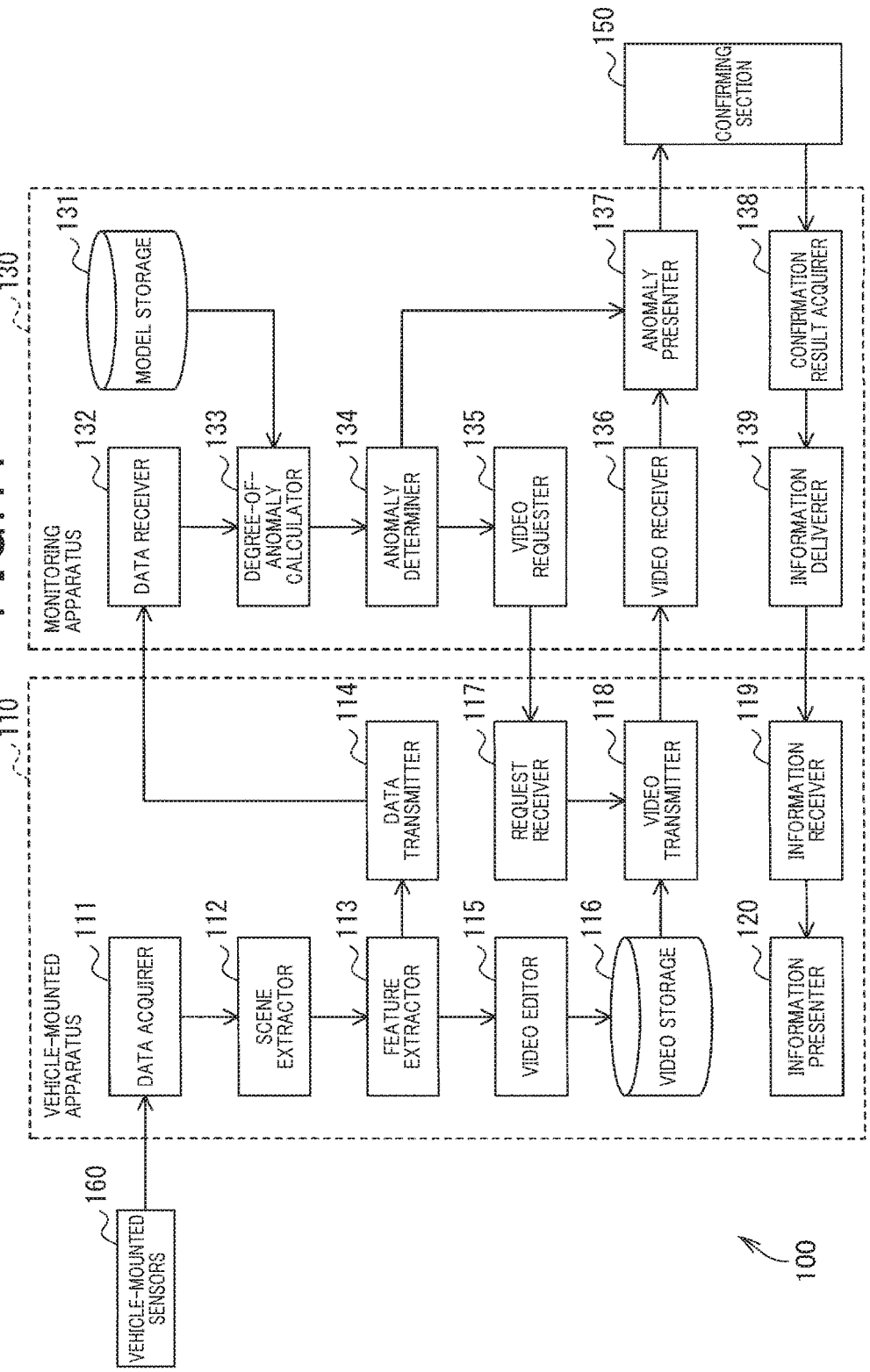
FIG. 11 is a block diagram of a monitoring system in accordance with a second embodiment.

A monitoring system 100 shown in FIG. 11 includes a vehicle-mounted apparatus 110 and a monitoring apparatus 130 that wirelessly communicates with the vehicle-mounted apparatus 110.

Each of the vehicle-mounted apparatus 110 and the monitoring apparatus 130 may be formed of one or more microcomputers, each incorporating therein a central processing unit (CPU) and a memory that is a non-transitory computer readable storage medium (e.g., random access memory (RAM), read only memory (ROM), and flash, etc.). Various functions of each of the vehicle-mounted apparatus 110 and the monitoring apparatus 130 may be implemented by the CPU executing programs stored in the memory, thereby performing methods corresponding to the programs.

These functions of each of the vehicle-mounted apparatus 110 and the monitoring apparatus 130 may be implemented by software only, hardware only, or a combination thereof. For example, when these functions are provided by an electronic circuit which is hardware, the electronic circuit can be provided by a digital circuit including many logic circuits, an analog circuit, or a combination thereof.

3-2. Vehicle-Mounted Apparatus

The vehicle-mounted apparatus 110, which may be configured as a microcomputer, includes a data acquirer 111, a scene extractor 112, a feature extractor 113, a data transmitter 114, a video editor 115, a request receiver 117, a video transmitter 118 an information receiver 119, an information presenter 120. Various functions of these functional blocks may be implemented by the CPU executing programs stored in a memory of the microcomputer. The memory has at least a storage area as a video storage 116. In the following, a vehicle carrying the vehicle-mounted apparatus 110 will be referred to as an own vehicle.

Figure 12:
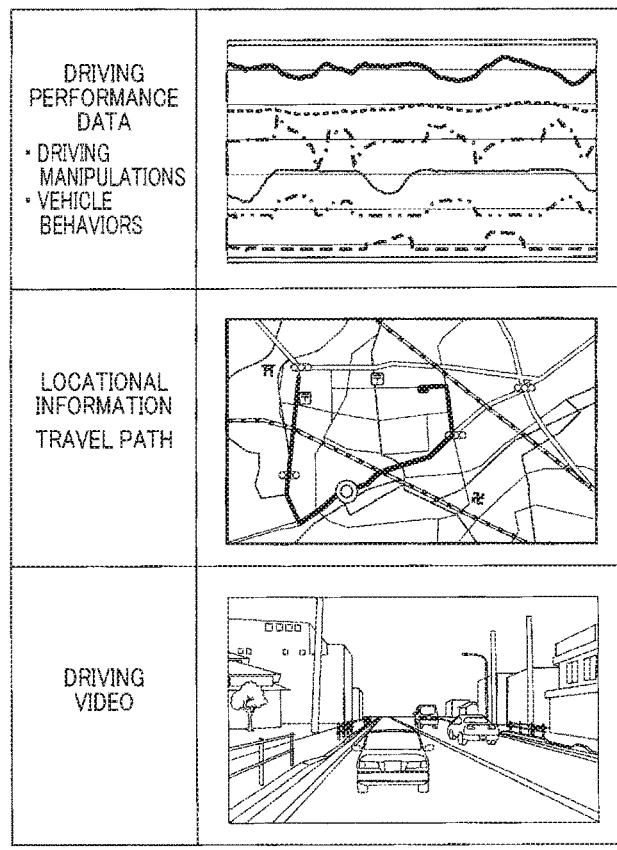
FIG. 12 is an example of information acquired by an information acquirer.

The data acquirer 111 transmits acquires own-vehicle information, surroundings information, locational information, and temporal information from various sensors (hereinafter referred to as vehicle-mounted sensors) 160 including a camera mounted in the own vehicle iteratively every predetermined time interval. As shown in FIG. 12, the own-vehicle information, hereinafter referred to as driving performance data, is information representing behaviors of the own vehicle and driving manipulations on the own vehicle. The driving performance data includes, for example, an accelerator pedal position, a brake pressure, a steering angle, a vehicle speed, accelerations, a yaw rate and others. The surroundings information, which is information about surroundings of the own vehicle, includes, for example, target information about the other vehicles and obstacle around the own vehicle that can be detected using driving video acquired from the vehicle-mounted camera, radar sensors or the like, and weather information such as sunny or rainy weather. The locational information and the temporal information include a current time, a current location and travel direction of the own vehicle acquired from the GPS receiver or the navigation unit mounted in the own vehicle. The locational information includes information about a travel path.

Figure 13:
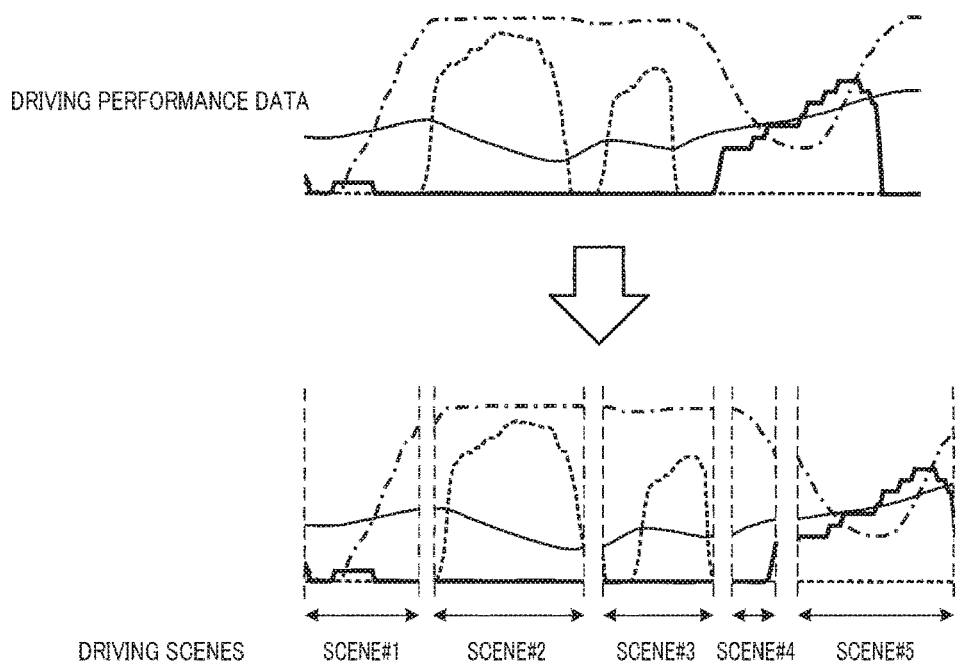
FIG. 13 is an illustration of scene extraction performed by a scene extractor.

The scene extractor 112, as shown in FIG. 13, divides a time-sequence of driving performance data (hereinafter referred to as time-sequence data) acquired from the data acquirer 111 into a plurality of sub-sequences that are respectively recurring time-sequence patterns of driving performance data, where each sub-sequence of driving performance data is a discriminable driving scene. Each driving scene extracted in such a manner is assigned a scene identity (ID). A well-known encoding technique disclosed in, for example, Japanese Patent Application Laid-Open Publication No. 2013-250663 may be used to extract such driving scenes. Alternatively, the driving scenes may be extracted according to prescribed rules, such as a rule that a stationary state of the vehicle is a driving scene.

Figure 14:
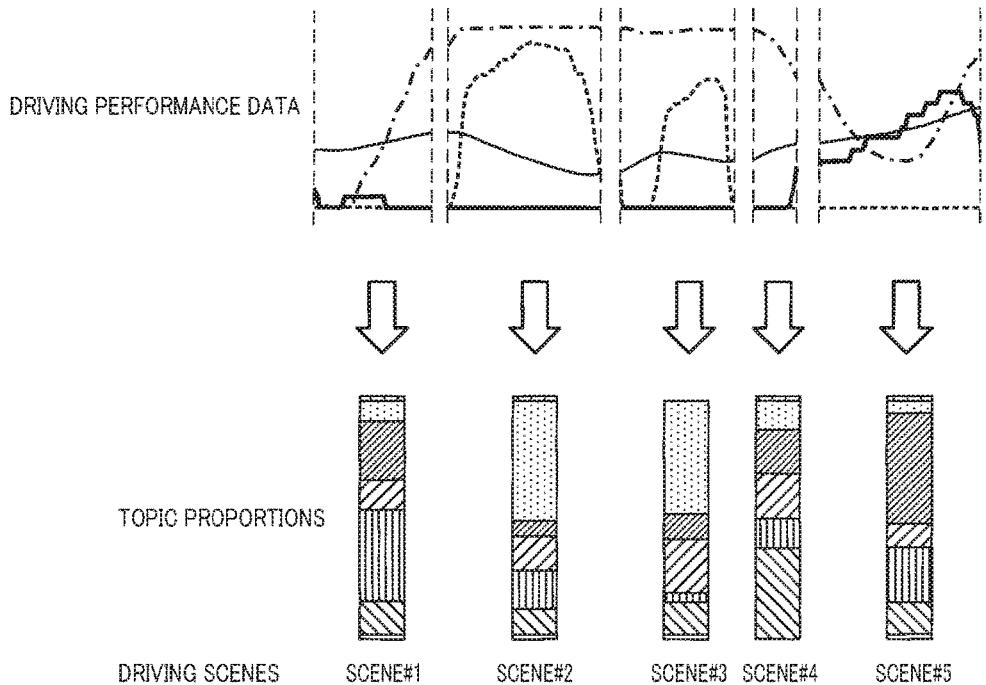
FIG. 14 is an illustration of feature extraction performed by a feature extractor.

The feature extractor 113 extracts, from each driving scene, scene features representing features of the driving scene. As shown in FIG. 14, a topic proportion is used to express such scene features. The topic proportion represents mixing ratios of a plurality of predefined driving topics representing a characteristic pattern of the driving scene of interest. Such a topic proportion is a known technique disclosed in, for example, Japanese Patent Application Laid-Open Publication No. 2014-235605, and will therefore not be described in detail.

The data transmitter 114 transmits, to the monitoring apparatus 130, scene features extracted by the feature extractor 113 together with index information including the scene identity (ID), the locational information and temporal information. In the following, the scene features and index information associated therewith are collectively referred to as correspondence information.

Figure 15:
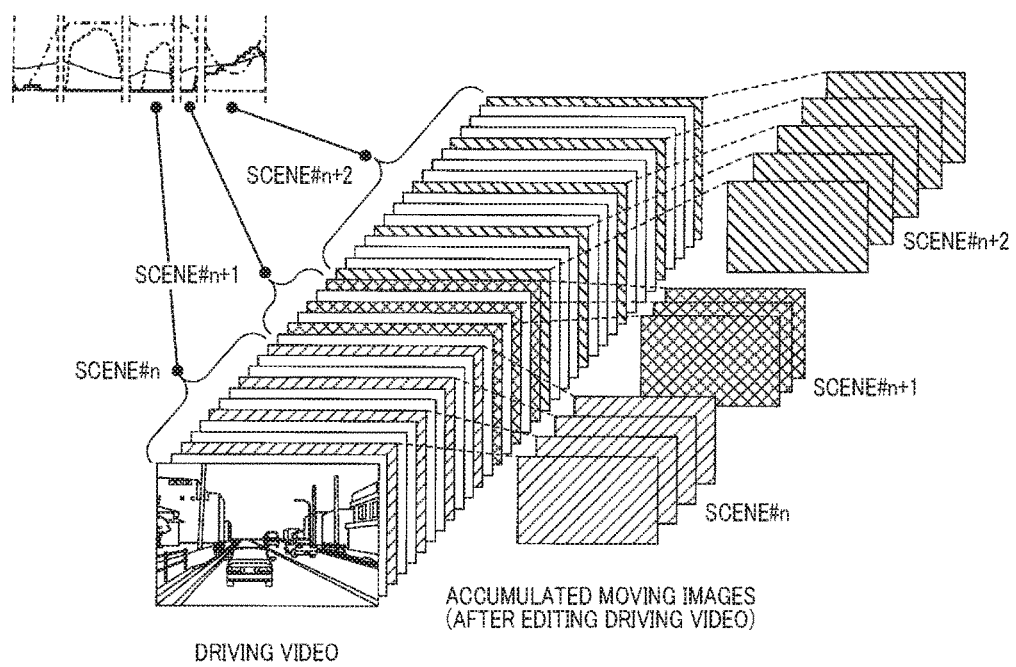
FIG. 15 is an illustration of processing performed by a video editor.

The video editor 115 divides driving video acquired from the data acquirer 111 into a plurality of portions of the driving video, each of which corresponds to one driving scene, and compresses a data amount by decimating and encoding the driving video. As shown FIG. 15, a portion of the driving video corresponding to each driving scene is decimated. Preferably, a decimation amount of driving video for each driving scene may be increased with increasing length or duration of the driving scene. A well-known video summarization technique disclosed in Japanese Patent Application Laid-Open Publication No. 2014-027481 may be used as such a decimation technique. The decimation technique is not limited to the technique using video summarization, but may include decimating a portion of driving video for each driving scene every time interval predetermined for the driving scene. It should be noted that in each decimation technique should not decimate any points at which driving scenes are switched. When MPEG is used in encoding the driving video, the points at which driving scenes are switched are start points of group of pictures (GOP) such that prediction encoding is only applied within a respective one driving scene. That is, moving images are generated by compressing the driving video, such that a portion of the driving video corresponding to each driving scene can be played independent of another driving scene. More specifically, before moving image compression, driving scenes have a length of hundreds of milliseconds to dozens of seconds, and one to five seconds in average. Compressing moving images for each driving scene can provide ½oth the total data amount as compared with before the moving image compression.

Figure 16:
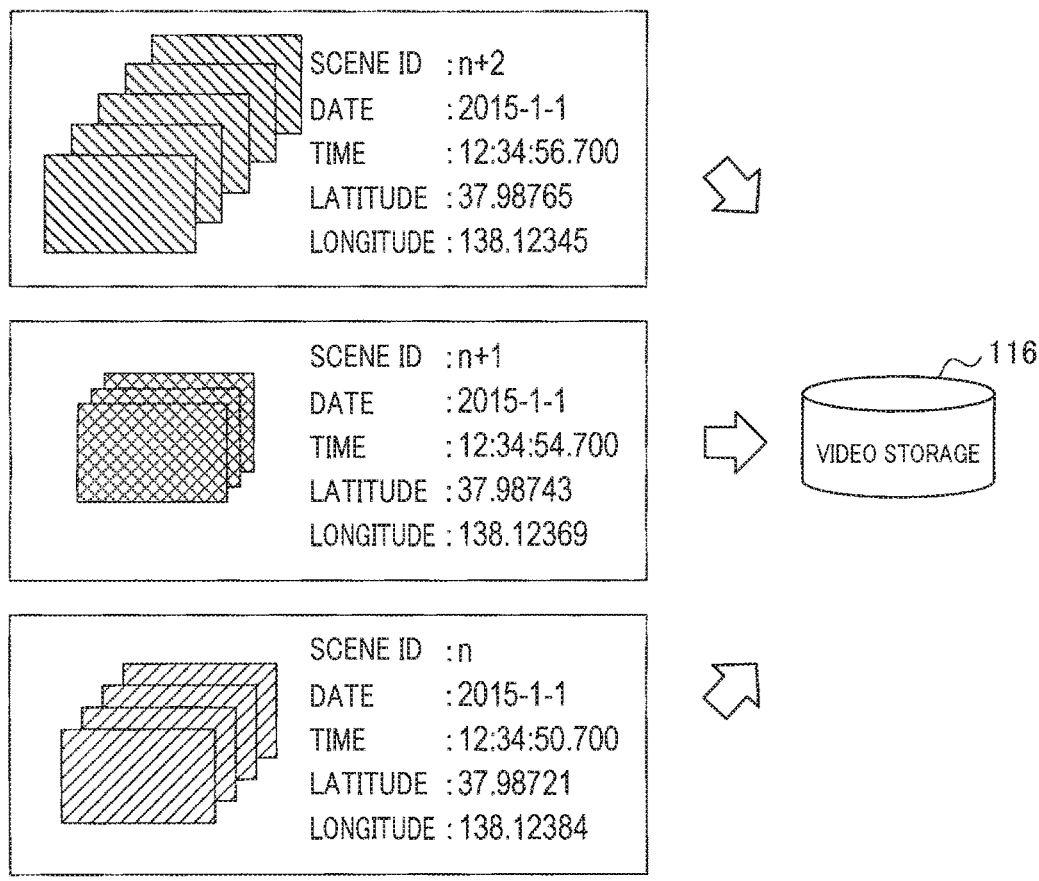
FIG. 16 is an example of data stored in a video storage.

The video storage 116 stores, for each driving scene, moving images edited by the video editor 115 together with index information including at least the scene identity (ID), locational information, and temporal information, as shown in FIG. 16. In cases where a file is divided into portions corresponding to the respective driving scenes, the video storage 116 further stores file path information about temporal connections between the driving scenes. In cases where a succession in time of driving scenes is merged in one file, the video storage 116 further stores information for identifying seek points representing locations of the respective driving scenes in the file.

The request receiver 117 receives a video request from the monitoring apparatus 130 via the wireless communications. The video request includes an acquisition condition for identifying required video. The acquisition condition can be used to search for the index information. More specifically, the acquisition condition may be the scene ID, time, location, or combination thereof.

Figure 17:
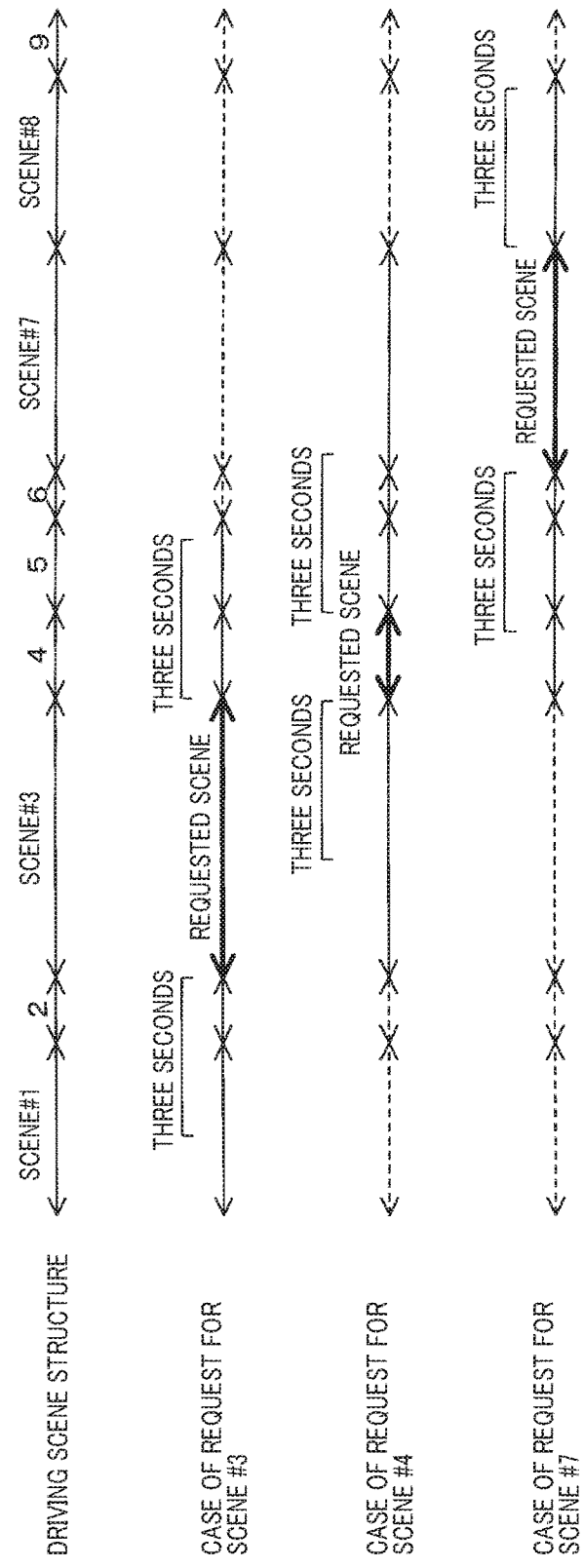
FIG. 17 is an illustration of processing performed by a video transmitter.

The video transmitter 118 reads, from the video storage 116, moving images identified from an acquisition condition for a video request received by the request receiver 117, and transmits the moving images to the monitoring apparatus 130. For example, when the acquisition condition is a scene ID, the video transmitter 118 transmits moving images for the driving scene identified from the scene ID (hereinafter referred to as a specific driving scene) and driving scenes within predetermined ranges before and after the specific driving scene. The driving scenes within predetermined ranges before and after the specific driving scene are, for example, as shown in FIG. 17, driving scenes within predetermined periods of time (e.g., three seconds) before and after the specific driving scene. In such a case, the number of driving scenes within these ranges may vary with the scene ID. Alternatively, the number of driving scenes within each of predetermined ranges before and after the specific driving scene may be three. In addition, for each scene ID, data indicating which driving scenes are included in ranges before and after the specific driving scene identified from the acquisition condition may be pre-stored in the video storage 116. In such a configuration, upon receipt of the video request, required moving images can be rapidly transmitted without calculating the predetermined ranges.

The information receiver 119 receives anomaly information about an anomaly in the road condition delivered from the monitoring apparatus 130.

Figure 18:
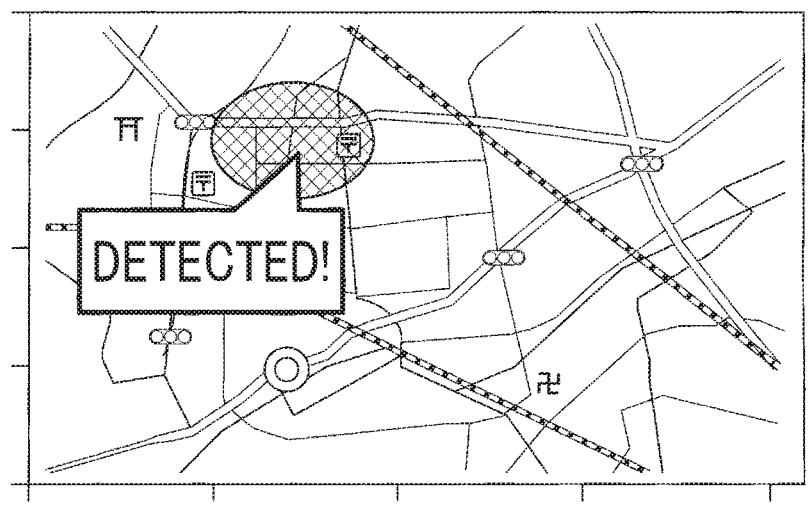
FIG. 18 is an example of information presented by an anomaly presenter.
Figure 19:
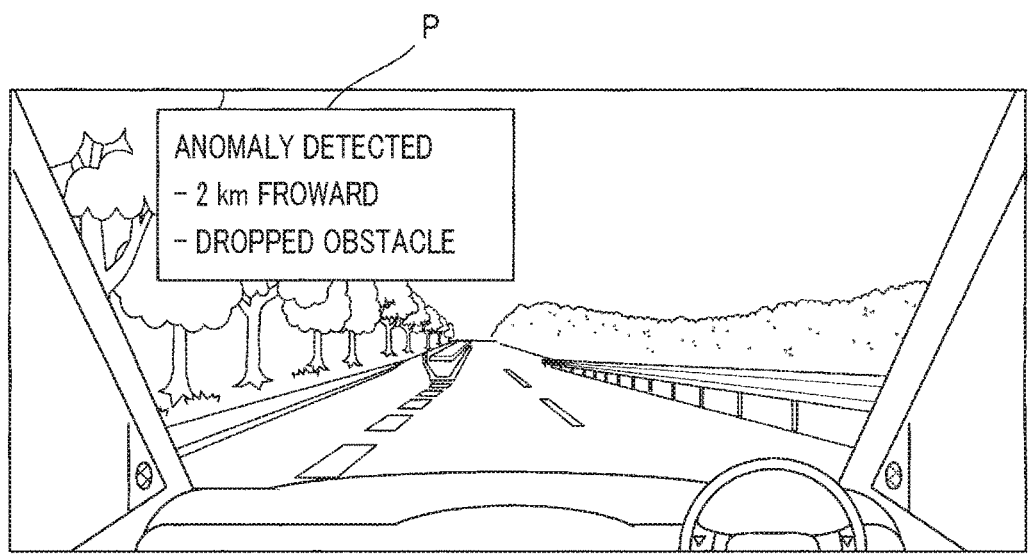
FIG. 19 is an example of information presented by an information presenter.

The information presenter 120 presents to occupants of the own vehicle the anomaly information received by the information receiver 119. More specifically, as shown in FIG. 18, a location where an anomaly has been detected may be highlighted on a map screen of the navigation unit. Alternatively, as shown in FIG. 19, a text box P informing details of the anomaly may be displayed using a head-up display or the like. As another alternative, audio, an indicator lamp, or a combination thereof may be used to notify the occupants of the anomaly.

3-3. Monitoring Apparatus

The monitoring apparatus 130, which may be configured as a microcomputer, includes a data receiver 131, a degree-of-anomaly calculator 133, an anomaly determiner 134, a video requester 135, a video receiver 136, an anomaly presenter 137, a confirmation result acquirer 138, and an information deliverer 139. Various functions of these functional blocks may be implemented by the CPU executing programs stored in a memory of the microcomputer. The memory has a storage area for a model storage 132.

The data receiver 131 acquires the correspondence information from the vehicle-mounted apparatus 110.

The model storage 132 stores model information about driving models associated with route sections. The route sections are defined by dividing a roadway that the vehicle can travel on into a plurality of sections. The driving models are scene features (for example, mean values) for the respective route sections, which are generated by statistically processing the past correspondence information. These driving models may be prepared depending on weather and time.

The driving models may be updated based on information acquired by the data receiver 131.

The degree-of-anomaly calculator 133, based on feature information acquired by the data receiver 131, calculates a degree of deviation of scene features indicated by the feature information from the driving model read from the model storage 132 using locational information indicated by the feature information, as a degree of anomaly in scene features. The scene features and the driving model can be expressed by a multidimensional vector. Therefore, for example, a distance between these vectors is calculated as a degree of deviation, that is, as a degree of anomaly.

The anomaly determiner 134, based on the degree of anomaly calculated by the degree-of-anomaly calculator 133, generates, a frequency distribution indicating a frequency of a degree of anomaly for each anomaly determination section. The anomaly determination sections are defined by dividing a roadway that the vehicle can travel on, including a single route section or a plurality of route sections. If a frequency of the degree of anomaly for an anomaly determination section is equal to or greater than a predetermined frequency threshold, it is determined that there is an anomaly in the anomaly determination section. Such an anomaly determination section is detected as an abnormal section. The anomaly determiner 134 outputs the detected abnormal section and correspondence information about the detected abnormal section to the video requester 135 and the anomaly presenter 137.

The video requester 135 generates an acquisition condition to identify the abnormal section detected by the anomaly determiner 134, and transmits a video request including the acquisition condition to the vehicle-mounted apparatus 110. The acquisition condition includes at least a scene ID or locational information corresponding to the abnormal section. The acquisition condition may further include temporal information associated with the scene features for which the degree of anomaly is equal to or greater than the anomaly determination value.

The video receiver 136 receives video (i.e., moving images) transmitted by the vehicle-mounted apparatus 110 in reply to the video request from the video requester 135. The moving images may include the driving scene identified from the acquisition condition and driving scenes within predetermined ranges before and after the identified driving scene.

The anomaly presenter 137, based on information about the abnormal section provided from the anomaly determiner 134, provides a map image on which a location of the abnormal section is shown, driving performance data as the vehicle is traveling in the abnormal section, and moving images received by the video receiver 136, to the confirming section 150.

At the confirming section 150, the map image, the driving performance data, and the moving images presented by the anomaly presenter 137 are displayed on a screen of a computer operated by an operator that monitors a road condition. Visually confirming the map image, the driving performance data, and the moving images, the operator identifies the specific content of the detected anomaly, inputs information about the content via the computer. Preferably, the operator may input a determination as to whether to deliver information about the detected anomaly.

The confirmation result acquirer 138 acquires the information inputted at the confirming section 150 as anomaly information. The anomaly information may include text information about the specific content of the detected anomaly and locational information about the abnormal section where the detected anomaly is occurring.

The information deliverer 139 delivers the anomaly information acquired by the confirmation result acquirer 138 to the vehicle-mounted apparatus 110 to which to deliver the anomaly information. When the anomaly information includes a determination as to whether to deliver information about the detected anomaly, the information deliverer 139 determines whether to deliver the anomaly information based on the anomaly information. The anomaly information will be delivered to the vehicle-mounted apparatus 110 mounted in each vehicle traveling towards the abnormal section.

3-4. Operations

In the monitoring system 100 configured as above, the vehicle-mounted apparatus 110 mounted in each vehicle generates scene features for each driving scene based on the driving performance data and transmits the scene features together with the index information to the monitoring apparatus 130. The vehicle-mounted apparatus 110 edits and compresses the driving video to generate moving images in a readable form for each driving scene and stores the moving images in association with the index information in the video storage 116.

The monitoring apparatus 130 compares the scene features acquired from the vehicle-mounted apparatus 110 of each vehicle with the driving model corresponding to the location where the scene features were acquired, thereby calculating a degree of anomaly in the scene features. In addition, the monitoring apparatus 130 generates a frequency distribution of a degree of anomaly for each anomaly determination section to determine the presence of an anomaly in the anomaly determination section based on the frequency distribution, and detects the anomaly determination section determined to have an anomaly as an abnormal section. The monitoring apparatus 130 requests, to the vehicle-mounted apparatus 110, the moving images that meet an acquisition condition set to enable acquiring at least the moving images for the abnormal section.

The vehicle-mounted apparatus 110 reads from the video storage 116 the moving images corresponding to the video request received from the monitoring apparatus 130, and sends them back to the monitoring apparatus 130.

The monitoring apparatus 130 presents to the confirming section 150 the acquired moving images and the correspondence information about the abnormal section.

At the confirming section 150, the operator visually confirms the information received form the monitoring apparatus 130 displayed on the screen of the computer to confirm the specific content of the anomaly occurring in the abnormal section and inputs the confirmed content to the computer.

The monitoring apparatus 130 acquires the anomaly information that is the information inputted to the computed at the confirming section 150 and delivers the anomaly information to the vehicle-mounted apparatus of each vehicle traveling towards the abnormal section.

Upon receipt of the anomaly information, the vehicle-mounted apparatus 110 of each vehicle traveling towards the abnormal section presents the anomaly information to the driver.

3-5. Advantages

The embodiment set forth above can provide the following advantages.

(5a) Comparing the scene features based on the driving performance data of each vehicle with the driving model, it is possible to properly detect an abnormal section having an anomaly in the road condition without using the images. For example, in the presence of a dropped object, there may be various patterns in image recognition depending on object types and appearances. In the present embodiment, being based on the driving performance data, it is possible to detect scene features based on the common driving performance data indicative of bypassing the dropped object regardless of object types and appearances, which can make it possible to more properly detect the presence of an anomaly. The driving model is defined for each route section, which can prevent mistakenly detecting an anomaly in a route section having a road shape which may cause vehicles to behave as if they move around a dropped object even though there is no dropped object in the route section.

(5b) The monitoring apparatus 130 does not separately determine the presence or absence of an anomaly in the road condition using scene features acquired from each vehicle. In the present embodiment, the monitoring apparatus 130 does determine the presence or absence of an anomaly in the road condition using a frequency distribution of a degree of anomaly in the scene features for each anomaly determination section, that is, using information acquired from a plurality of vehicles. This configuration can exclude a sudden anomaly such as an animal crossing a roadway, and an anomaly caused by a vehicle factor, such as a sensor failure. In addition, when a plurality of vehicles are affected by a common anomaly in the road condition, use of the anomaly determination sections larger than the route sections for which the driving models are generated enables coping with an issue that the plurality of vehicles may not always be affected within the same route section.

(5c) The monitoring apparatus 130 acquires only the video about a section determined to have an anomaly from the vehicle-mounted apparatus 110 to determine the specific content of the anomaly. This configuration can reduce the communications traffic between the vehicle-mounted apparatus 110 and the monitoring apparatus 130 and workload of visual confirmation or the like at the monitoring apparatus 130.

(5d) In the present embodiment, the operator determines the specific content of the anomaly, which enables flexibly making a final determination, such as a determination as to whether to deliver the anomaly information.

(5e) The driving video is encoded based on key frames disposed between different driving scenes, which makes it possible to play the moving images for each driving scene. With this configuration, the monitoring apparatus 130 may only acquire necessary driving scenes, which can improve communication and work efficiency.

(5f) The driving video is encoded in a manner such that a decimation amount of driving video for each driving scene is increased with increasing length or duration of the driving scene. This configuration can suppress variances in length or duration of the moving images for each driving scene to be played and can reduce the storage capacity of the video storage 116 and the communications traffic between the vehicle-mounted apparatus 110 and the monitoring apparatus 130.

(5g) The moving images are stored in the video storage 116 in association with the index information including the scene ID, the locational information and temporal information. With this configuration, properly setting the acquisition conditions enables various searches. For example, in some cases where the same vehicle passes the same location several times, all the moving images relating to the location can be searched. When a search is performed using the temporal information, the moving images can uniquely be retrieved for each vehicle because a vehicle is present at only one location at a certain time instance. When a search is performed using both the temporal information and the locational information, information can be collected from all of the vehicles that have passed a certain location at a certain time instance.

(5h) The monitoring apparatus 130 delivers the anomaly information to the vehicle-mounted apparatus 110 of each vehicle traveling towards the abnormal section. This configuration allows the driver of each vehicle traveling towards the abnormal section to pay attention before arriving at the anomaly.

4. Modifications (M1) In the first embodiment and its modification, the vehicle-mounted anomaly detection apparatus 20 receives the driving model from an external apparatus 10 when approaching the external apparatus 10. Alternatively, the monitoring apparatus 40 of the monitoring center may acquire a travel location of a vehicle via communications with the anomaly detection apparatus 20 of the vehicle, and depending on the travel location, the monitoring apparatus 40 may transmit the driving model to the anomaly detection apparatus 20.

(M2) Like map data of the navigation unit, in an alternative embodiment, a database of driving models may be prestored in the model storage 24 of the anomaly detection apparatus 20, and the driving models may be updated in response to instructions from the monitoring apparatus 40 of the monitoring center. In such an embodiment, the driving models stored in the external apparatus 10 may also be updated.

(M3) In an alternative embodiment, when a vehicle is traveling on a regular roadway other than an expressway, the anomaly detection apparatus of the vehicle may compare a topic proportion calculated from the driving performance data with a driving model to calculate a degree of anomaly in the driving state. This configuration allows the monitoring apparatus of the monitoring center to detect an anomaly in the road condition of the regular roadway based on the anomaly data received from each vehicle traveling on the regular roadway.

(M4) In an alternative embodiment, the model storage 12 of the external apparatus 10, 50 may store a set of topic proportions in addition to variances and a mean vector for the topic proportions as a driving model corresponding to a roadside unit location where the external apparatus 10, 50 is located.

In such an embodiment where a set of topic proportions are stored in the model storage 12, when requested to transmit the driving model from a vehicle, the model transmitter 16 may transmit variances for the topic proportions, a mean vector for the topic proportions, and the set of topic proportions as a driving model to the vehicle.

Figure 10:
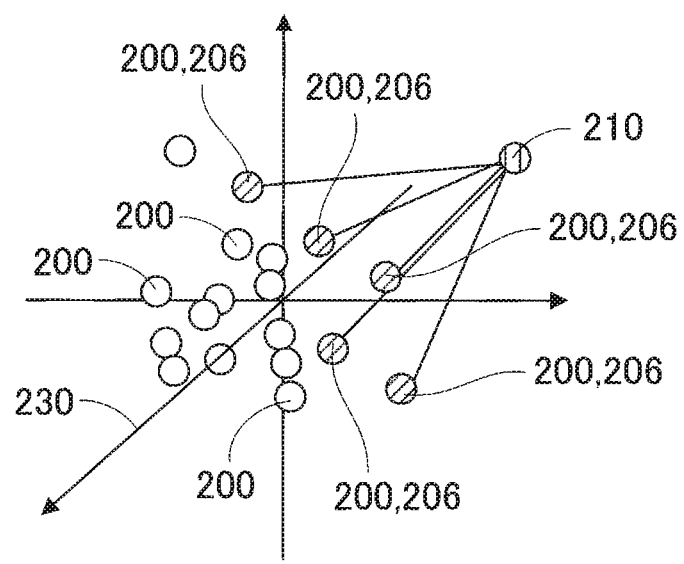
FIG. 10 is another illustration of calculation of a degree of anomaly.

In such an embodiment, as shown in FIG. 10, the degree-of-anomaly calculator 38 of the anomaly detection apparatus 20, 60 calculates an average over distances between the topic proportion 210 for the current driving state and a plurality of topic proportions 206, among the plurality of topic proportion 200 used to generate the driving model, closer to the topic proportion 210 for the current driving state.

The degree-of-anomaly calculator 38 may calculate a distance that is the calculated average distance normalized by the variance-covariance matrix for the topic proportions 206, as a degree of anomaly.

(M5) In this modification, the data transmitter 28 of the anomaly detection apparatus 60 may store data, instead of transmitting the data at a communication frequency lower than the transmission frequency in cases where the degree of anomaly is above the anomaly determination value. When the anomaly detection apparatus 60 becomes able to communicate with the roadside unit, the data transmitter 28 may transmit the data to the monitoring center via communications with the roadside unit. With this configuration, the data can be transmitted at low cost and at a higher communication speed.

(M6) In the first embodiment and its modification, a histogram is used to represent a feature distribution of the driving performance data for each segmented driving scene. A range of value of the driving performance data is divided into bins. The histogram represents an appearance frequency of the driving performance data in each bin. As an alternative, for each driving scene, a change in the driving performance data over time may be used as a feature distribution. As another alternative, for each driving scene, an average of the driving performance data may be used as a feature distribution.

(M7) In the second embodiment, the feature extractor 113 extracts scene features for each driving scene, and the data transmitter 114 transmits to the monitoring apparatus 130 the extracted scene features together with the index information. Alternatively, instead of transmitting the scene features, the data transmitter 114 may transmit the driving performance data itself and the index information to the monitoring apparatus 130. In such an embodiment, the driving video may be edited by dividing the driving video into a plurality of segments of constant length, and the monitoring apparatus may extract features from the driving performance data.

(M8) In the second embodiment, the driving scenes are extracted based on recurring time-sequence patterns of driving performance data or based on predefined rules. Alternatively, the driving scenes may be extracted by dividing the driving performance data into a plurality of segments of constant length.

(M9) In the second embodiment, the driving video is edited by being divided into driving scenes. Alternatively, the driving video may be edited by being divided into a plurality of segments of constant length.

(M10) In the second embodiment, the topic proportions are used as the scene features. Alternatively, something else featuring the driving performance data, for example, the driving performance data itself, a frequency distribution of values representing the driving performance data, a frequency distribution or mean value of values representing the driving performance data, or others, may be used.

(M11) In the second embodiment, the driving models are generated by previously statistically processing past correspondence information. Alternatively, some or all of the past correspondence information may be stored as the driving models. In such an embodiment, the degree-of-anomaly calculator 133 may calculate an average over the first to fifth smallest distances to the scene features as a degree of deviation of the scene features from the driving model.

(M12) In the second embodiment, if, in a frequency distribution for a degree of anomaly calculated for each route section, the degree of anomaly is equal to or greater than a frequency threshold, it is determined that there is an anomaly in the route section corresponding to the degree of anomaly. Alternatively, if a degree of anomaly is equal to or greater than an anomaly determination value, it may be determined that there is an anomaly in the route section corresponding to the degree of anomaly.

(M13) In the second embodiment, the monitoring apparatus 130 requests each vehicle to send driving video about an abnormal section determined to have an anomaly. Alternatively, the monitoring apparatus 130 may more preferentially request a vehicle that has transmitted the scene features for which a degree of the anomaly equal to or greater than the anomaly determination value has been detected at an earlier time to send the driving video about the abnormal section. This configuration allows the operator to more properly determine the content of the anomaly based on the video immediately after the same anomaly has occurred.

(M14) In the second embodiment, the operator determines the content of the anomaly. Alternatively, the content of the anomaly may be determined by image recognition or the like.

(M15) The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

(M8) Besides the anomaly detection apparatus disclosed above, the present invention may be embodied in various forms, e.g., as a monitoring system including the anomaly detection apparatus disclosed above as a component, an anomaly detection program enabling a computer to function as the anomaly detection apparatus disclosed above, a computer readable medium bearing this anomaly detection program, and an anomaly detection method.

(M16) Besides the monitoring system disclosed above, the present invention may be embodied in various forms, e.g., as a monitoring system including the vehicle-mounted apparatus and monitoring apparatus described above, a computer program enabling a computer to function as the vehicle-mounted apparatus and monitoring apparatus described above, and a tangible, non-transitory computer-readable medium bearing this computer program.

What is claimed is:

1. An anomaly detection apparatus incorporated in a monitoring system for monitoring a road condition based on a driving state of a vehicle, the apparatus being mounted in the vehicle and comprising:
 a model storage configured to store a driving model, the driving model corresponding to a travel location of the vehicle traveling on a roadway and representing a driving state as the vehicle is traveling, wherein the driving model is a probabilistic model for driving features representing features of the driving state;
 a data acquirer configured to acquire driving performance data representing the driving state of the vehicle;
 a degree-of-anomaly calculator configured to calculate a degree of anomaly in the driving state based on the driving model stored in the model storage and the driving performance data acquired by the data acquirer, wherein the degree-of-anomaly calculator is further configured to calculate whether the degree of anomaly is increasing with a decreasing occurrence probability of the driving state;

a vehicle-mounted transmitter configured to, in response to the degree of anomaly calculated by the degree-of-anomaly calculator exceeding an anomaly determination value for determining the presence of an anomaly in the driving state, transmit at least the degree of anomaly and the travel location corresponding to the degree of anomaly to a monitoring center located external to the vehicle and configured to detect an anomaly in the road condition based on the degree of anomaly;

a scene extractor configured to divide a sequence of the driving performance data into a plurality of sub-sequences of the driving performance data, each sub-sequence of the driving performance data representing a driving scene; and a feature calculator configured to, for each of one or more items of the driving performance data, generate a feature distribution representing an appearance frequency of the driving performance data in each of a plurality of bins obtained by dividing a range of values of the driving performance data for each driving scene, and calculate, as the driving features, a topic proportion that is a representation of mixing ratios of a plurality of basis feature distributions, the plurality of basis feature distributions being prepared in advance as driving topics and being used to represent one or more types of feature distributions of the one or more items of the driving performance data.

2. The anomaly detection apparatus according to claim 1, further comprising a vehicle receiver configured to receive the driving model from either an external apparatus located external to the vehicle or the monitoring center, wherein the model storage is configured to store the driving model received by the vehicle receiver.

3. The anomaly detection apparatus according to claim 2, wherein the vehicle receiver is configured to receive at least the driving model corresponding to the travel location, among the travel location and a time period of the day when the vehicle is traveling, from either the external apparatus or the monitoring center.

4. The anomaly detection apparatus according to claim 3, wherein:

the external apparatus is installed at a predetermined location along the roadway; and the vehicle receiver is configured to receive the driving model corresponding to the predetermined location where the external apparatus is installed from the external apparatus.

5. The anomaly detection apparatus according to claim 4, further comprising:

a scene extractor configured to divide a sequence of the driving performance data into a plurality of sub-sequences of the driving performance data, each sub-sequence of the driving performance data representing a specific driving scene, to thereby extract the driving scenes; and a feature calculator configured to, for each of one or more items of the driving performance data, generate, as the driving features, a feature distribution representing a distribution of features of the driving performance data for each driving scene.

6. The anomaly detection apparatus according to claim 5, wherein each sub-sequence of the driving performance data representing a specific driving scene is a recurring time-sequence pattern of the driving performance data.

7. A monitoring apparatus installed in a monitoring center located external to a vehicle and configured to detect an anomaly in a road condition based on a driving state of the vehicle, the apparatus comprising:

a data receiver configured to, in response to the vehicle determining that a degree of anomaly calculated based on a driving model corresponding to a travel location of the vehicle and representing a driving state as the vehicle is traveling and driving performance data representing the driving state of the vehicle exceeds an anomaly determination value for determining the presence of an anomaly in the driving state, receive a degree of anomaly and the travel location corresponding to the degree of anomaly from the vehicle, wherein the driving model is a probabilistic model for driving features representing features of the driving state;

a degree-of-anomaly storage configured to store the degree of anomaly received by the data receiver in association with the travel location of the vehicle;

a roadway anomaly detector configured to, in response to an accumulated value of the degree of anomaly stored in the degree-of-anomaly storage in association with the travel location exceeding a cumulative determination value for determining the presence of an anomaly in the road condition, determine that there is an anomaly in the road condition;

a scene extractor configured to divide a sequence of the driving performance data into a plurality of sub-sequences of the driving performance data, each sub-sequence of the driving performance data representing a driving scene; and a feature calculator configured to, for each of one or more items of the driving performance data, generate a feature distribution representing an appearance frequency of the driving performance data in each of a plurality of bins obtained by dividing a range of values of the driving performance data for each driving scene, and calculate, as the driving features, a topic proportion that is a representation of mixing ratios of a plurality of basis feature distributions, the plurality of basis feature distributions being prepared in advance as driving topics and being used to represent one or more types of feature distributions of the one or more items of the driving performance data.

8. A monitoring system incorporating an anomaly detection apparatus mounted in a vehicle and configured to detect an anomaly in a driving state of the vehicle, a monitoring apparatus installed in a monitoring center located external to the vehicle, and an external apparatus installed at a predetermined location along a roadway, wherein the anomaly detection apparatus comprises:

a model storage configured to store a driving model, the driving model corresponding to a travel location of the vehicle and representing a driving state as the vehicle is traveling, wherein the driving model is a probabilistic model for driving features representing features of the driving state;

a data acquirer configured to acquire driving performance data representing the driving state of the vehicle;

a degree-of-anomaly calculator configured to calculate a degree of anomaly in the driving state based on the driving model stored in the model storage and the driving performance data acquired by the data acquirer, wherein the degree-of-anomaly calculator is further configured to calculate whether the degree of anomaly is increasing with a decreasing occurrence probability of the driving state; and a vehicle-mounted transmitter configured to, in response to the degree of anomaly calculated by the degree-of-anomaly calculator exceeding an anomaly determination value for determining the presence of an anomaly in the driving state, transmit at least the degree of anomaly and the travel location corresponding to the degree of anomaly to the monitoring center located external to the vehicle and configured to detect an anomaly in the road condition based on the degree of anomaly, the external apparatus comprises a model transmitter configured to transmit the driving model corresponding to at least the travel location, among the travel location of the vehicle and a time, to the vehicle, a scene extractor configured to divide a sequence of the driving performance data into a plurality of sub-sequences of the driving performance data, each sub-sequence of the driving performance data representing a driving scene, and a feature calculator configured to, for each of one or more items of the driving performance data, generate a feature distribution representing an appearance frequency of the driving performance data in each of a plurality of bins obtained by dividing a range of values of the driving performance data for each driving scene, and calculate, as the driving features, a topic proportion that is a representation of mixing ratios of a plurality of basis feature distributions, the plurality of basis feature distributions being prepared in advance as driving topics and being used to represent one or more types of feature distributions of the one or more items of the driving performance data; and the monitoring apparatus comprises:

a data receiver configured to receive the degree of anomaly and the travel location corresponding to the degree of anomaly from the vehicle;

a degree-of-anomaly storage configured to store the degree of anomaly received by the data receiver in association with the travel location of the vehicle; and a roadway anomaly detector configured to, in response to an accumulated value of the degree of anomaly stored in the degree-of-anomaly storage in association with the travel location exceeding a cumulative determination value for determining the presence of an anomaly in the road condition, determine that there is an anomaly in the road condition.

9. A monitoring system for monitoring a road condition using information acquired at a vehicle, comprising:

a vehicle-mounted apparatus mounted in the vehicle and a monitoring apparatus that communicates with the vehicle-mounted apparatus, wherein the vehicle-mounted apparatus comprises: a data acquirer configured to repeatedly acquire driving performance data representing at least either behaviors of an own vehicle that is the vehicle carrying the vehicle-mounted apparatus or driving manipulations on the own vehicle;

a data transmitter configured to transmit correspondence information to the monitoring apparatus, the correspondence information associating the driving performance data acquired by the data acquirer and index information including at least a location where the driving performance data was acquired;

a video recorder configured to store video acquired from a vehicle-mounted camera for capturing images of surroundings around the own vehicle in association with the index information; and a video provider configured to, in response to a request from the monitoring apparatus, provide the video having the index information that meets an acquisition condition indicated by the request to the monitoring apparatus, the monitoring apparatus comprises:

a model storage configured to store driving models, each driving model representing typical features of the driving performance data of a vehicle traveling on a roadway;

a data receiver configured to acquire the correspondence information from the vehicle-mounted apparatus;

an anomaly detector configured to compare driving information with a subject driving model and thereby detect an abnormal section of the roadway determined to have an anomaly in the driving information, the driving information being the driving performance data included in acquired information that is the corresponding information acquired by the data receiver, the subject driving model being a driving model stored in the model storage corresponding to a subject location that is a location indicated by the index information included in the acquired information; and a video acquirer configured to set the acquisition condition such that the acquisition condition includes at least a location of the abnormal section detected by the anomaly detector and acquire the video that meets the acquisition condition from the vehicle-mounted apparatus.

10. The monitoring system according to claim 9, wherein the model storage stores the driving models that are respectively associated with route sections defined by dividing the roadway into multiple sections.

11. The monitoring system according to claim 10, wherein the anomaly detector is configured to calculate, for each route section, a degree of deviation of the driving information from the subject driving model as a degree of anomaly, and calculate a frequency distribution of the degree of anomaly for each anomaly determination section including a single route section or a plurality of consecutive route sections, and detect an anomaly determination section for which a frequency with which the degree of anomaly becomes equal to or greater than a predetermined anomaly determination value becomes equal to or greater than a predetermined frequency threshold as an abnormal section.

12. The monitoring system according to claim 10, wherein the anomaly detector is configured to calculate, for each route section, a degree of deviation of the driving information from the subject driving model as a degree of anomaly, and detect a route section for which the degree of anomaly becomes equal to or greater than a predetermined anomaly determination value as an abnormal section.

13. The monitoring system according to claim 11, wherein the video acquirer is configured to more preferentially request a vehicle among vehicles that have transmitted the correspondence information having the subject location included in the abnormal section detected by the anomaly detector, in which the degree of anomaly equal to or greater than the anomaly determination value has been calculated at an earlier time, to send the video.

14. The monitoring system according to claim 9, further comprising a confirmation result acquirer configured to acquire a result of confirmation of the content of the anomaly in the abnormal section as anomaly information.

15. The monitoring system according to claim 14, wherein the confirmation result acquirer comprises:
   a presenter configured to present the acquired information and the video acquired by the video acquirer relating to the acquired information; and
   an acquirer configured to acquire a result of confirmation of the content of the anomaly based on the content presented by the presenter.

16. The monitoring system according to claim 9, wherein the video recorder stores the video decimated according to a predefined rule.

17. The monitoring system according to claim 9, wherein:
   the vehicle-mounted apparatus further comprises a feature extractor configured to extract feature information representing features of the driving performance data from the driving performance data acquired by the data acquirer;
   the data transmitter is configured to generate correspondence information associating the feature information generated by the feature extractor with index information including at least a location where the feature information was acquired, and transmit the correspondence information to the monitoring apparatus; and
   the anomaly detector is configured to regard the feature information included in the acquired information as the driving information.

18. The monitoring system according to claim 17, wherein:
   the vehicle-mounted apparatus further comprises a scene extractor configured to divide a sequence of driving performance data acquired by the data acquirer into a plurality of sub-sequences of driving performance data, each sub-sequence of driving performance data representing a specific driving scene; and
   the feature extractor is configured to generate the feature information for each driving scene extracted by the scene extractor.

19. The monitoring system according to claim 18, wherein the video provider is configured to provide the video for the driving scene that meets the acquisition condition and driving scenes within predetermined ranges before and after the driving scene that meets the acquisition condition.

20. The monitoring system according to claim 18, wherein the video recorder is configured to record the video from the vehicle-mounted camera encoded in a form such that the video can be replayed separately for each driving scene.

21. The monitoring system according to claim 9, further comprising:
   a confirmation result acquirer configured to acquire a result of confirmation of the content of the anomaly in the abnormal section as anomaly information; and
   an information deliverer configured to deliver the anomaly information acquired by the confirmation result acquirer to a predefined delivery destination, the vehicle-mounted apparatus further comprises an information presenter configured to present the anomaly information delivered from the monitoring apparatus to an occupant of the own vehicle.

22. The monitoring system according to claim 21, wherein the information deliverer is configured to deliver the anomaly information to a vehicle traveling towards the abnormal section indicated by the anomaly information as the delivery destination.

* * * * *

UNITED STATES PATENT AND TRADEMARK OFFICE
CERTIFICATE OF CORRECTION

PATENT NO. : 10,347,122 B2
APPLICATION NO. : 15/646879
DATED : July 9, 2019
INVENTOR(S) : Kazuhito Takenaka It is certified that error appears in the above-identified patent and that said Letters Patent is hereby corrected as shown below:

On the Title Page

Column 1, item (73), Line 4 (approx.), change "DENSON CORPORATION," to --DENSO CORPORATION--.

Signed and Sealed this
Nineteenth Day of November, 2019

Andrei Iancu
*Director of the United States Patent and Trademark Office*